(12) United States Patent
Patton et al.

(10) Patent No.: US 12,602,724 B2
(45) Date of Patent: *Apr. 14, 2026

(54) DUAL LEDGER SYNCING

(71) Applicant: TRETE Inc., Prosper, TX (US)

(72) Inventors: Damien Patton, Plano, TX (US);
Christian Gratton, Eaton Rapids, MI
(US); Rish Mehta, Castro Valley, CA
(US)

(73) Assignee: TRETE, Inc., Prosper, TX (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 19/286,621

(22) Filed: Jul. 31, 2025

(65) Prior Publication Data
US 2025/0356421 A1 Nov. 20, 2025

Related U.S. Application Data

(63) Continuation-in-part of application No. 19/008,216,
filed on Jan. 2, 2025, now Pat. No. 12,387,265, which
(Continued)

(51) Int. Cl.
| | |
|---|---|
| *G06Q 40/04* | (2012.01) |
| *G06F 16/215* | (2019.01) |
| *G06F 16/23* | (2019.01) |
| *G06F 16/27* | (2019.01) |
| *G06Q 20/36* | (2012.01) |
| *G06Q 20/38* | (2012.01) |
| *G06Q 20/40* | (2012.01) |
| *G06Q 20/42* | (2012.01) |

| | |
|---|---|
| *G06Q 30/0601* | (2023.01) |
| *G06Q 40/06* | (2012.01) |
| (Continued) | |

(52) U.S. Cl.
CPC .......... *G06Q 40/04* (2013.01); *G06F 16/215*
(2019.01); *G06F 16/2358* (2019.01); *G06F*
*16/2379* (2019.01); *G06F 16/275* (2019.01);
*G06Q 20/363* (2013.01); *G06Q 20/3674*
(2013.01); *G06Q 20/3829* (2013.01); *G06Q*
*20/389* (2013.01); *G06Q 20/401* (2013.01);
*G06Q 20/42* (2013.01); *G06Q 30/0613*
(2013.01); *G06Q 40/06* (2013.01); *H04L 9/50*
(2022.05); *H04L 67/1097* (2013.01); *G06F*
*16/27* (2019.01); *G06Q 2220/00* (2013.01)

(58) Field of Classification Search
CPC .... G06F 16/275; G06F 16/27; G06F 16/2358;
G06F 16/2379; G06F 16/215; H04L 9/50;
H04L 67/1097; G06Q 40/04; G06Q
20/363; G06Q 20/3674; G06Q 20/3065;
G06Q 20/389; G06Q 20/401; G06Q
20/02; G06Q 30/0613; G06Q 40/06;
G06Q 2220/00
See application file for complete search history.

(56) References Cited

U.S. PATENT DOCUMENTS

| | | | |
|---|---|---|---|
| 10,587,628 B2 * | 3/2020 | Setty ....................... H04L 67/10 |
| 11,637,691 B2 * | 4/2023 | Venkataramappa .... G06F 16/27 |
| | | | 713/171 |

(Continued)

*Primary Examiner* — Marcin R Filipczyk

(57) ABSTRACT

In certain aspects, a computer-implemented method includes
monitoring data entries written on a database. The computer-
implemented method includes recording at least part of the
data entries written on the database to a blockchain.

20 Claims, 18 Drawing Sheets

Related U.S. Application Data is a continuation of application No. 18/616,165, filed on Mar. 26, 2024, now Pat. No. 12,222,961.

(60) Provisional application No. 63/615,128, filed on Dec. 27, 2023, provisional application No. 63/615,136, filed on Dec. 27, 2023, provisional application No. 63/615,108, filed on Dec. 27, 2023, provisional application No. 63/615,145, filed on Dec. 27, 2023, provisional application No. 63/600,381, filed on Nov. 17, 2023, provisional application No. 63/596,471, filed on Nov. 6, 2023, provisional application No. 63/515,337, filed on Jul. 24, 2023, provisional application No. 63/509,261, filed on Jun. 20, 2023, provisional application No. 63/509,264, filed on Jun. 20, 2023, provisional application No. 63/509,266, filed on Jun. 20, 2023, provisional application No. 63/509,257, filed on Jun. 20, 2023, provisional application No. 63/454,622, filed on Mar. 24, 2023.

(51) Int. Cl.
   *H04L 9/00*       (2022.01)
   *H04L 67/1097*    (2022.01)

(56)                References Cited

U.S. PATENT DOCUMENTS

| | | | |
|---|---|---|---|
| 11,880,349 B2 * | 1/2024 | Padmanabhan | H04L 9/3239 |
| 2020/0272619 A1 * | 8/2020 | Alferov | H04L 9/3239 |
| 2024/0160703 A1 * | 5/2024 | Lipton | G06F 21/1087 |
| 2024/0265002 A1 * | 8/2024 | Banerjee | G06Q 20/223 |
| 2024/0273542 A1 * | 8/2024 | Rojas | H04L 9/3247 |

* cited by examiner

Step 2 (Audit Ledgers)

Step 3

Primary Ledger
102                                                                      914

Ledger Entry Date/Time_Transaction Date/Time_UserID_Transaction
ID_Asset ID_Token ID(s)_Transaction Type_Final Value ($)

Hash IDs - Data Kept off Chain

Ledger Entry Date/Time_Transaction Date/Time_UserID_Transaction
ID_Asset ID_Token ID(s)_Transaction Type_Final Value ($)

Hash IDs - Data Kept off Chain

104
Secondary Ledger

1500

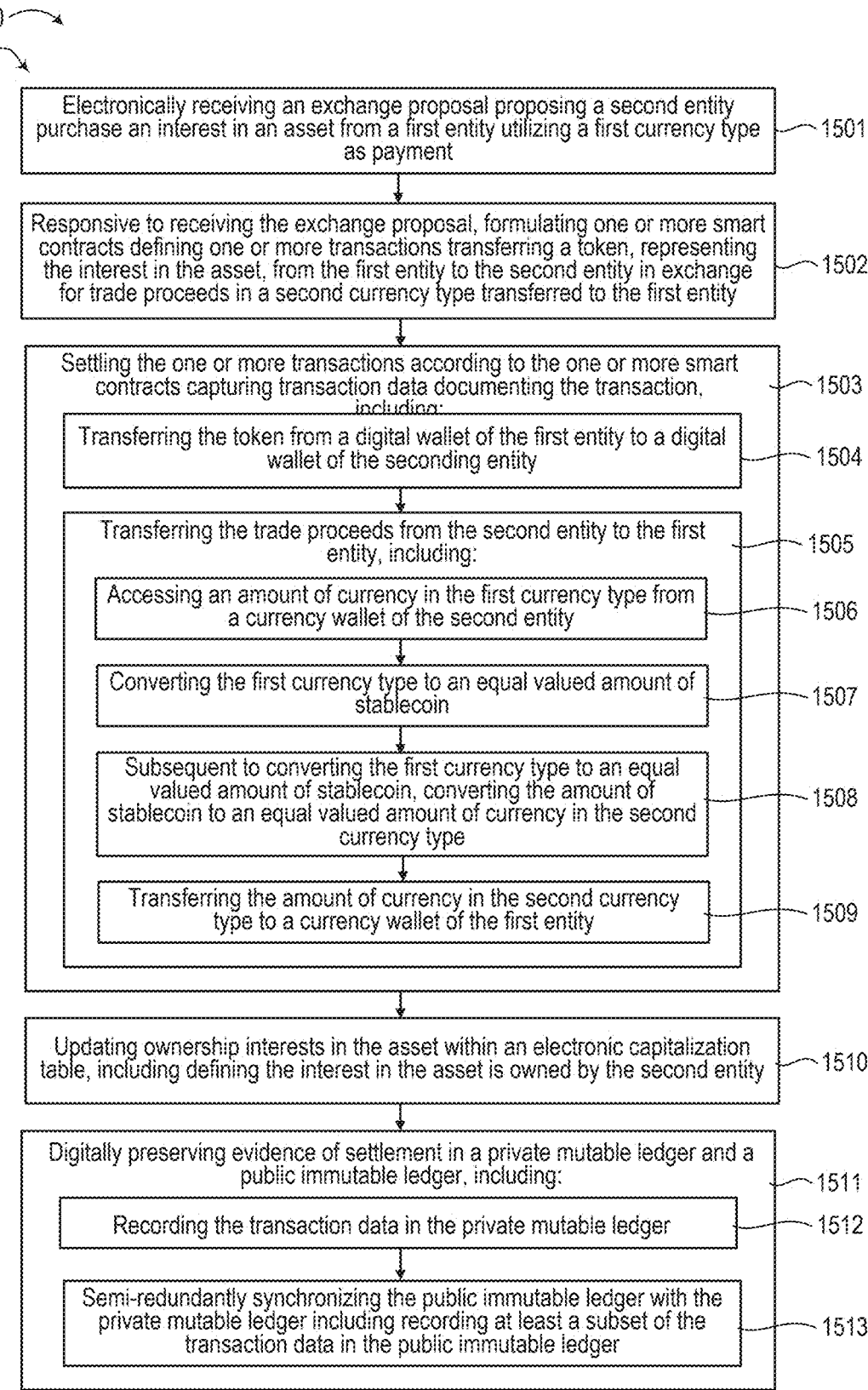

Electronically receiving an exchange proposal proposing a second entity purchase an interest in an asset from a first entity utilizing a first currency type as payment —1501

Responsive to receiving the exchange proposal, formulating one or more smart contracts defining one or more transactions transferring a token, representing the interest in the asset, from the first entity to the second entity in exchange for trade proceeds in a second currency type transferred to the first entity —1502

Settling the one or more transactions according to the one or more smart contracts capturing transaction data documenting the transaction, including: —1503

Transferring the token from a digital wallet of the first entity to a digital wallet of the seconding entity —1504

Transferring the trade proceeds from the second entity to the first entity, including: —1505

Accessing an amount of currency in the first currency type from a currency wallet of the second entity —1506

Converting the first currency type to an equal valued amount of stablecoin —1507

Subsequent to converting the first currency type to an equal valued amount of stablecoin, converting the amount of stablecoin to an equal valued amount of currency in the second currency type —1508

Transferring the amount of currency in the second currency type to a currency wallet of the first entity —1509

Updating ownership interests in the asset within an electronic capitalization table, including defining the interest in the asset is owned by the second entity —1510

Digitally preserving evidence of settlement in a private mutable ledger and a public immutable ledger, including: —1511

Recording the transaction data in the private mutable ledger —1512

Semi-redundantly synchronizing the public immutable ledger with the private mutable ledger including recording at least a subset of the transaction data in the public immutable ledger —1513

FIG. 15

DUAL LEDGER SYNCING

CROSS REFERENCE TO RELATED APPLICATIONS

The present application is a continuation in part of U.S. patent application Ser. No. 19/008,216, entitled "Dual Ledger Syncing", filed Jan. 2, 2025, which is incorporated herein in its entirety.

That application is a continuation of U.S. patent application Ser. No. 18/661,165, now U.S. Pat. No. 12,222,961, entitled "Dual Ledger Syncing", filed Mar. 26, 2024, which is incorporated herein in its entirety.

That application claims the benefit of priority under 35 U.S.C. § 119 from U.S. Provisional Patent Application Ser. No. 63/454,622, entitled "Transaction Platform With Synchronized Semi-Redundant Ledgers," filed on Mar. 24, 2023, all of which is incorporated herein by reference in its entirety for all purposes. That application claims the benefit of priority under 35 U.S.C. § 119 from U.S. Provisional Patent Application Ser. No. 63/509,257, entitled "Data Retrieval and Validation for Asset Onboarding," filed on Jun. 20, 2023, all of which is incorporated herein by reference in its entirety for all purposes. That application claims the benefit of priority under 35 U.S.C. § 119 from U.S. Provisional Patent Application Ser. No. 63/509,261, entitled "Data Validation and Assessment Valuation," filed on Jun. 20, 2023, all of which is incorporated herein by reference in its entirety for all purposes. That application claims the benefit of priority under 35 U.S.C. § 119 from U.S. Provisional Patent Application Ser. No. 63/509,264, entitled "Secure Identifier Integration," filed on Jun. 20, 2023, all of which is incorporated herein by reference in its entirety for all purposes. That application claims the benefit of priority under 35 U.S.C. § 119 from U.S. Provisional Patent Application Ser. No. 63/509,266, entitled "Dual Ledger Syncing," filed on Jun. 20, 2023, all of which is incorporated herein by reference in its entirety for all purposes. That application claims the benefit of priority under 35 U.S.C. § 119 from U.S. Provisional Patent Application Ser. No. 63/515,337, entitled "Metadata Process, with Static and Evolving Attributes, Introduced into Tokenization Standards," filed on Jul. 24, 2023, all of which is incorporated herein by reference in its entirety for all purposes. That application claims the benefit of priority under 35 U.S.C. § 119 from U.S. Provisional Patent Application Ser. No. 63/596,471, entitled "Real Asset Fractionalization Algorithm," filed on Nov. 6, 2023, all of which is incorporated herein by reference in its entirety for all purposes. That application claims the benefit of priority under 35 U.S.C. § 119 from U.S. Provisional Patent Application Ser. No. 63/600,381, entitled "Settlement and Approval Service," filed on Nov. 17, 2023, all of which is incorporated herein by reference in its entirety for all purposes. That application claims the benefit of priority under 35 U.S.C. § 119 from U.S. Provisional Patent Application Ser. No. 63/615,108, entitled "Live Syncing Capitalization Table System," filed on Dec. 27, 2023, all of which is incorporated herein by reference in its entirety for all purposes. That application claims the benefit of priority under 35 U.S.C. § 119 from U.S. Provisional Patent Application Ser. No. 63/615,128, entitled "Transaction Flow with Master Account Ledger and Escrow Ledger Interaction," filed on Dec. 27, 2023, all of which is incorporated herein by reference in its entirety for all purposes. That application claims the benefit of priority under 35 U.S.C. § 119 from U.S. Provisional Patent Application Ser. No. 63/615,136, entitled "Regenerative Model- Continuous Evolution System ("RM-CES")," filed on Dec. 27, 2023, all of which is incorporated herein by reference in its entirety for all purposes. That application claims the benefit of priority under 35 U.S.C. § 119 from U.S. Provisional Patent Application Ser. No. 63/615,145, entitled "Transaction & Settlement Validation Service ("TSVS")," filed on Dec. 27, 2023, all of which is incorporated herein by reference in its entirety for all purposes.

TECHNICAL FIELD

The present disclosure generally relates to blockchain technology, e.g., cryptographically encoded ledgers distributed across a computing network, and more specifically relates to transaction platforms with semi-redundant ledgers.

BACKGROUND

There is a need for a technology platform that can create digital securities out of what are known as "real assets" and can function as a secondary market platform or Financial Exchange for these types of assets as well as for other types of assets such as, but not limited to, investments in franchises, investments in business that generate dividends or returns based on performance of the business or underlying asset, investments in ventures that capture or mine natural resource such as, but not limited to uranium, timber, and other commodities, private credit, private debt, intangible assets, tradeable assets, and any other types of appropriate assets. Examples of real assets include office buildings, multi-family apartment buildings, car washes, private planes or yachts, antique cars, art, jewelry, insurance policies, and even structured products that are based on the performance of an underlying asset (e.g. a racehorse). It should be understood that the disclosed technology is not limited to creating digital securities.

Real estate, for example, has long been a preferred investment, offering competitive risk-adjusted returns and a hedge against inflation. Direct investments in industries, such as real estate, e.g., purchasing real estate directly, involves deploying and risking large initial and ongoing financial sums. In contrast, indirect investments, e.g., Real Estate Investment Trusts (REITs) and other deal structures and/or securities that pool sums of money from multiple investors together to purchase investments, facilitate individual investors deploying and risking smaller initial and ongoing financial sums. Such indirect investments also involve other costs and require compliance with relevant securities statutes and regulations.

The description provided in the background section should not be assumed to be prior art merely because it is mentioned in or associated with the background section. The background section may include information that describes one or more aspects of the subject technology.

SUMMARY

Examples extend to methods, systems, and computer program products for dual syncing ledgers.

In one aspect, transaction data resulting from a settled transaction changing ownership in an asset at an Alternative Trading System (ATS) is accessed. The transaction data includes evidence of a currency conversion between a stablecoin and another currency, the stablecoin selected based on stablecoin characteristics maintained in a stablecoin record. An intentional lag time defining a fixed amount of time to delay between detecting a data entry being written to a mutable database and subsequently syncing a blockchain with the mutable database is accessed. The specified amount of time increases the likelihood of written data entries being complete and correct at the mutable database prior to syncing.

A part of the transaction data captured to the mutable database is detected during monitoring the mutable database. The part of the transaction data reflects the currency conversion and the stablecoin characteristics used during transaction settlement at the mutable database. Synching the blockchain with the mutable database is delayed by the fixed amount of time upon detecting the part of the transaction data being captured. Responsive to completion of the delay, the blockchain is synced with the mutable database by recording at least a portion of the transaction data from the mutable database to the blockchain, the at least a portion of the transaction data including another part of the transaction data written to the mutable database during the delay.

Generally, aspects of the invention relate to an electronic and computer technology platform for facilitating a (e.g., "closed") electronic secondary market exchange for tokens (e.g., cryptographic tokens that represent shares or other interests in real estate and/or other assets) which are created by and may be traded by participants registered and validated by a computer system integrated within the technology platform (as opposed to third party token marketplaces). The technology platform includes a novel specialized computer architecture and customized computer code adapted and programmed to implement novel functions that are not currently and have not previously been performed with prior asset exchange platforms. Novel aspects include semi-redundant ledgers that are automatically synchronized by the computer system and which overcome other technical limitations of prior transaction management systems. (possible to have third party market places)

An exemplary aspect relates to a pair of synchronized semi-redundant ledgers that maintain a public and/or private record of each transaction executed on the platform (for example, recorded on a blockchain), in which personally identifiable information (PII) of parties to the transaction are not disclosed and therefore not publicly accessible via the semi-redundant ledgers. In other aspects, the pair of synchronized semi-redundant ledgers maintain, instead, a private record of each transaction. An example can be a regular ledger of any type that is backed up and synchronized with a blockchain (public or private ledger). This automated auditing mechanism facilitates fraud, theft, and loss (if used for inventory instead of real assets). For example, a Consumer Packaged Goods ("CPG") company could keep their entire inventory system on the blockchain to audit stores to control shrinkage, loss prevention, and/or theft.

An exemplary aspect of the disclosed technology includes a computer system specially configured and programmed to perform functions of a transaction platform that includes a network-accessible computer server system with semi-redundant ledgers which are automatically synchronized by the computer system. The semi-redundant ledgers include a first ledger type that may include a database (e.g., centrally controlled by an operator of the computer system); a tokenization module configured to create and/or manage tokens as described herein and configured to interact with a second ledger (e.g., a blockchain); a digital wallet management module configured to receive, store, and transmit digital tokens; and a role-based access module configured to validate participants and their authorized roles as well as authorize and/or limit the participants' functional interactions with the computer system based on their approved roles. The transaction platform with semi-redundant ledgers may provide mechanisms by which investors may trade and/or exchange (e.g., acquire and/or transfer) tokenized portions of real estate/real properties while remaining anonymous (as described herein). The tokenized portions of real estate/real properties may be referred to herein as "asset tokens." The mechanisms by which the investors may trade and/or exchange tokenized portions of real estate/real properties may include tokenization and a dual ledger system. The transaction platform may facilitate a property owner to tokenize the property by generating multiple tokens collectively representing the value of the property. The transaction platform may facilitate investors to browse listed properties and tokens representing fractional shares of the value of one or more properties. The transaction platform may facilitate investors to acquire and transfer the tokens.

An exemplary aspect of the disclosed technology may include the transaction platform being specially configured and programmed to record token transactions in two semi-redundant ledgers on a computing network. One ledger, referred to herein as the "primary ledger," is configured to maintain data stored therein as confidential. The primary ledger may be internal to the transaction platform. In the primary ledger, asset token transactions may be recorded in association with personally identifiable information (PII) of the buyer and seller of the token. The transactions are also recorded in a public or private ledger, referred to herein as the "secondary ledger." The secondary ledger may be implemented as a blockchain. In certain aspects, the secondary ledger is configured to support immutable features. The secondary ledger may be configured to not store personally identifiable information (PII) of the buyer(s) or seller(s).

While exemplary aspects of the transaction platform are described herein with reference to an underlying real estate or real property asset, it should be understood that the technology disclosed herein may be applied to any type of underlying asset including, but not limited to, intangible assets.

An exemplary method of exchanging digital assets representing fractional interests in an asset includes receiving information regarding characteristics (e.g., size, location, calculated values, depreciation) of an asset and generating a plurality of digital assets representing fractional interests in the asset. The method also includes establishing a smart contract for exchanging at least one of the plurality of digital assets held by a first entity for trade proceeds from a second entity. The method additionally includes performing a transaction according to the smart contract, and updating a capitalization table based on the performed transaction. The method further includes recording data pertaining to the performed transaction on a blockchain.

Others may be notified of the information regarding characteristics of an asset. Others may be invited to propose an exchange for at least one of the plurality of digital assets representing fractional interests in the asset. A proposal of an exchange for at least one of the plurality of digital assets may be received. Establishing the smart contract for the exchange for at least one of the plurality of digital assets may be responsive to receiving the proposal of the exchange.

The method may further include waiting a predefined period of time after a current owner's acquisition of the asset prior to inviting others to propose an exchange for at least one of the plurality of digital assets representing fractional interests in the asset. Transaction fees may be collected from at least one of the first entity and the second entity, the transaction fees set according to the smart contract governing the performed transaction. At least some of the collected transaction fees may be distributed as license fees to a third entity. Settlement statements pertaining to the performed transaction may be distributed to at least one of the first entity and the second entity. The method may additionally include recording transaction data pertaining to the performed transaction, including personally identifiable information of at least one of the first entity or the second entity, in a primary ledger configured to maintain the transaction data as confidential, and recording transaction data pertaining to the performed transaction, absent personally identifiable information of the first entity and the second entity, in a secondary ledger configured to make the transaction data publicly or privately available on a blockchain. The asset may include real estate, for example, and the digital assets representing fractional interests in the asset may include nonfungible tokens (NFTs), and/or, but is not limited to, fungible tokens, hybrid tokens, cryptocurrencies, crypto tokens, crypto coins, security token, and asset tokens, having metadata including identification information of the buyer of the NFTs. The smart contract may be established by a broker/dealer with at least one of the first entity or the second entity.

An exemplary non-transitory computer readable medium stores computer-readable instructions executable by a hardware computing processor to perform operations of a method for recording transactions with semi-redundant ledgers as described herein.

An exemplary system for recording transactions with semi-redundant ledgers includes at least one device including a hardware computing processor, the system being configured to perform operations of a method for recording transactions with semi-redundant ledgers as described herein. The system may include a non-transitory memory having stored thereon computing instructions, executable by the hardware computing processor, to perform operations of a method for recording transactions with semi-redundant ledgers as described herein.

An exemplary system for recording transactions with semi-redundant ledgers includes at least one device including a hardware circuit operable to perform a function, the system being configured to perform operations of a method for recording transactions with semi-redundant ledgers as described herein.

According to certain aspects of the present disclosure, a computer-implemented method is provided. The method includes receiving information regarding characteristics of an asset. The method includes generating at least one digital asset representing fractional interests in the asset. The method includes facilitating establishment of a smart contract for exchanging the at least one digital asset held by a first entity for trade proceeds from a second entity. The method includes performing a transaction based on the smart contract. The method includes updating a capitalization table based on performing the transaction. The method includes recording data, pertaining to the transaction that is performed, on a primary ledger and a secondary ledger.

According to certain aspects of the present disclosure, a system is provided. The system includes one or more memories comprising instructions and one or more processors configured to execute the instructions which, when executed, cause the one or more processors to receive information regarding characteristics of an asset. The one or more processors is configured to execute the instructions which, when executed, cause the one or more processors to generate at least one digital asset representing fractional interests in the asset. The one or more processors is configured to execute the instructions which, when executed, cause the one or more processors to facilitate establishment of a smart contract for exchanging the at least one digital asset held by a first entity for trade proceeds from a second entity. The one or more processors is configured to execute the instructions which, when executed, cause the one or more processors to perform a transaction based on the smart contract. The one or more processors is configured to execute the instructions which, when executed, cause the one or more processors to update a capitalization table based on performing the transaction. The one or more processors is configured to execute the instructions which, when executed, cause the one or more processors to record data, pertaining to the transaction that is performed, on a primary ledger and a secondary ledger.

According to other aspects of the present disclosure, a non-transitory machine-readable storage medium comprising machine-readable instructions for causing a processor to execute a method is provided. The method includes receiving information regarding characteristics of an asset. The method includes generating at least one digital asset representing fractional interests in the asset. The method includes facilitating establishment of a smart contract for exchanging the at least one digital asset held by a first entity for trade proceeds from a second entity. The method includes performing a transaction based on the smart contract. The method includes updating a capitalization table based on performing the transaction. The method includes recording data, pertaining to the transaction that is performed, on a primary ledger and a secondary ledger.

According to certain aspects of the present disclosure, a computer-implemented method is provided. The method includes monitoring data entries written on a private primary ledger. The computer-implemented method includes recording the data entries written on the private primary ledger to an immutable public secondary ledger.

According to certain aspects of the present disclosure, a system is provided. The system includes one or more memories comprising instructions and one or more processors configured to execute the instructions which, when executed, cause the one or more processors to monitor data entries written on a private primary ledger. The system includes one or more memories comprising instructions and one or more processors configured to execute the instructions which, when executed, cause the one or more processors to recording the data entries written on the private primary ledger to an immutable public secondary ledger.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

FIG. 15 illustrates a flow chart of an example method for settling a transaction including currency conversions.

Figure 1:
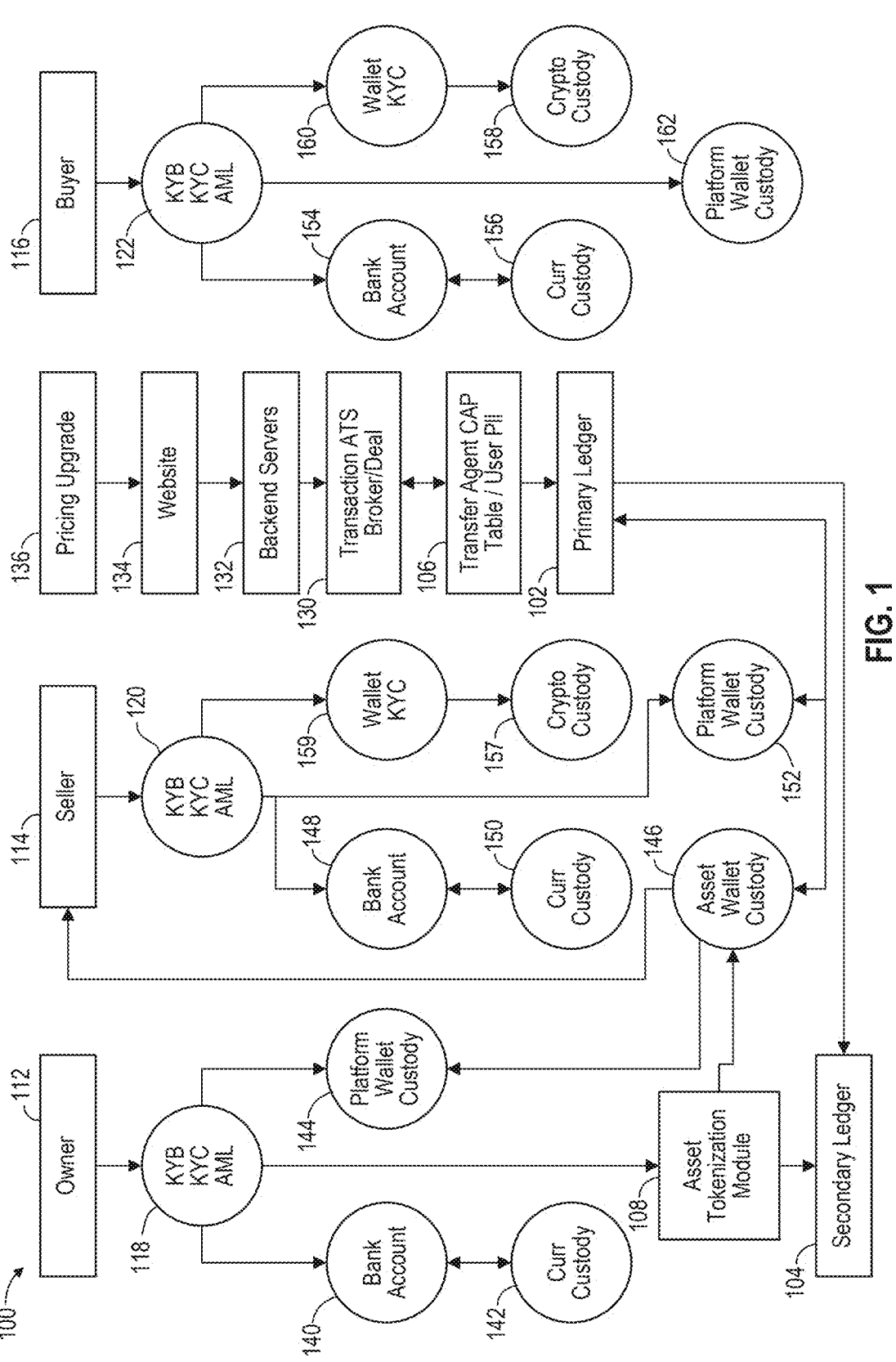
FIG. 1 is a block diagram illustrating an exemplary technological system including a transaction platform having semi-redundant ledgers.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Examples extend to methods, systems, and computer program products for dual syncing ledgers.

In one aspect, transaction data resulting from a settled transaction changing ownership in an asset at an Alternative Trading System (ATS) is accessed. The transaction data includes evidence of a currency conversion between a stablecoin and another currency, the stablecoin selected based on stablecoin characteristics maintained in a stablecoin record. An intentional lag time defining a fixed amount of time to delay between detecting a data entry being written to a mutable database and subsequently syncing a blockchain with the mutable database is accessed. The specified amount of time increases the likelihood of written data entries being complete and correct at the mutable database prior to syncing.

A part of the transaction data captured to the mutable database is detected during monitoring the mutable database. The part of the transaction data reflects the currency conversion and the stablecoin characteristics used during transaction settlement at the mutable database. Synching the blockchain with the mutable database is delayed by the fixed amount of time upon detecting the part of the transaction data being captured. Responsive to completion of the delay, the blockchain is synced with the mutable database by recording at least a portion of the transaction data from the mutable database to the blockchain, the at least a portion of the transaction data including another part of the transaction data written to the mutable database during the delay.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In general, aspects of the invention manage conversions between crypto, stablecoin, and fiat (with possible reference to currency pairs) at digital platforms functioning as intermediaries between different parties to a transaction, such as, for example, a transaction transferring ownership of a digital asset in exchange for currency. It may be that parties want to transact in different currency types. For example, one party to a transaction (e.g., a buyer or seller) may want to transact in crypto and a counter party to the transaction (e.g., the other of the buyer or seller) may want to transact in fiat. Further, one party may not even be interested in transacting with others that utilize a particular type of currency. For example, a seller transacting in fiat may not want to transact with a buyer transacting in crypto (e.g. due to the hassle of converting crypto to fiat, crypto volatility, etc.). Likewise, a seller transacting in crypto may not want to transact with a buyer transacting in fiat (e.g., due to centralized management of fiat, etc.).

Some parties may be ok transacting with others when permitted to interact with a digital platform (e.g., an Alternative Trading System (ATS), such as, ATS 100) in a preferred currency type and remaining blind to a currency type of counter parties. In these aspects, the digital platform (e.g., the ATS) can handle conversions (e.g., by referring to currency pairs), mitigate risks of the transacting parties, etc. increasing comfort of parties using the digital platform.

In one aspect, a digital platform, such as, an Alternative Trading System (ATS), electronically receives an exchange proposal proposing a second entity purchase an interest in an asset from a first entity utilizing a first currency type (e.g., crypto) as payment. Responsive to receiving the exchange proposal, the digital platform formulates a smart contract defining transferring a token, representing the interest in the asset, from the first entity to the second entity in exchange for trade proceeds in a second currency type (e.g., fiat) transferred from the second entity to the first entity.

The digital platform settles the transaction according to the smart contract capturing transaction data documenting the transaction. Transaction settlement includes transferring the token from a digital wallet of the first entity to a digital wallet of the seconding entity. Transaction settlement also includes transferring the trade proceeds from the second entity to the first entity.

Transferring trade proceeds includes accessing an amount of currency in the first currency type from the currency wallet of the second entity. Transferring trade proceeds includes converting the first currency type to an equal valued amount of stablecoin. Transferring trade proceeds includes, subsequent to converting the first currency type to an equal valued amount of stablecoin, converting the amount of stablecoin to an equal valued amount of currency in the second currency type. Transferring trade proceeds includes transferring the amount of currency in the second currency type to a currency wallet of the first entity.

Subsequent and in response to settling the transaction, the digital platform electronically and automatically updates ownership interests in the asset within an electronic capitalization table, including defining the interest in the asset is owned by the second entity and digitally preserves evidence of the transaction settlement in a private mutable ledger and a public immutable ledger. Digitally preserving evidence of the transaction includes recording the transaction data in the private mutable ledger. Digitally preserving evidence of the transaction also includes semi-redundantly synchronizing the public immutable ledger with the private mutable ledger including recording at least a subset of the transaction data in the public immutable ledger.

In this description and the following claims, "fiat currency" is defined as a type of government issued currency backed by the issuing government. The value of fiat currency is based on the public's trust in the issuing government and can vary based on supply and demand. Fiat currency is legal tender. That is, fiat currency is authorized by an issuing government to be used as a medium of exchange. Governments can increase the amount of fiat currency in circulation by issuing more units. Central banks can regulate the supply of money through open market operations, interest rates, and reserve requirements. Examples of fiat currency include: the U.S. dollar, the British pound, the Indian Rupee, and the euro. Hereinafter, fiat currency may be referred to simply as "fiat".

In this description and the following claims, "crypto currency" is defined as a digital currency designed to work through a computer network and is not reliant on any central authority, such as, a government or bank, to uphold or maintain it. Individual unit (e.g., coin) ownership records are stored in a digital ledger or blockchain, which is a computerized database that uses a consensus mechanism to secure transaction records, control the creation of additional coins, and verify the transfer of coin ownership. Coin ownership can be proved cryptographically. Examples of crypto currency include: Bitcoin, Ethereum, XRP, Dogecoin, Litecoin, etc.

In this description and the following claims, "stablecoin" is defined as a type of crypto currency where the value of units (e.g., coins) is pegged to a reference asset, such as, for example, fiat currency, exchange-traded commodities (e.g., precious metals or industrial metals), other crypto currency, crypto currency portfolios, another stablecoin, etc. In some aspects, a stablecoin is pegged 1:1 to a fiat currency, such as, the U.S. dollar. Examples of stablecoin include: Tether, USD Coin, True USD, USDC, etc.

In this description and the following claims, "non-stablecoin crypto currency" is defined as any crypto currency that is not a stablecoin. Hereinafter, non-stablecoin crypto currency may be referred to simply as "crypto".

In this description and the following claims, a "currency pair" is defined as a comparison of two different currencies against each other. A currency pair can indicate how much of one currency (fiat, crypto, or stablecoin) is required to buy a unit another currency (fiat, crypto or stablecoin). As such, currency pairs can be utilized to facilitate currency conversions, including conversations between crypto and fiat and vice versa, conversions between stablecoin and crypto and vice versa, conversations between stablecoin and fiat and vice versa, conversions between different stablecoins, conversions between different cryptos, and conversions between different fiats.

In a currency pair, the first currency listed is a base currency (fiat, crypto, or stablecoin) and the second currency listed is a quote currency (fiat, currency, or stablecoin). For example, "EUR/USD" indicates the price of one Euro (the base currency) compared to the U.S. Dollar (the quote currency). EUR/USD=1.10 indicates that 1 Euro can be purchased for 1.10 U.S. Dollars. Similarly, BTC/USD indicates the price of one Bitcoin (the base currency) compared to the U.S. Dollar (the quote currency). BTC/USD=99,579 indicates that one 1 Bitcoin can be purchased for 99,579 U.S. Dollars.

Currencies (fiat, crypto, or stablecoin) may be identified by an ISO currency code or a (e.g., three or four letter) alphabetic code. For example, the alphabetic code BTC identifies the crypto currency Bitcoin, the alphabetic code ETH identifies the crypto currency Ethereum, the alphabetic code USDT identifies the stablecoin Tether, the alphabetic code TUSD identifies the stablecoin TrueUSD, the alphabetic code EUR identifies the fiat currency Euro, etc.

Accordingly, aspects of the invention can utilize currency pairs including a base currency in any of fiat, crypto, or stablecoin and a quote currency in any of fiat, crypto, or stablecoin to facilitate currency conversions. In one example, a currency pair includes a base currency of Tether and a quote currency of Bitcoin (or vice versa). In another example, a currency pair includes a base currency of U.S. Dollars and a quote currency of USD coin (or vice versa). In a further example, a currency pair includes a base currency of Tether and a quote currency of True USD (or vice versa).

In one more specific aspect, an ATS settles a transaction between a buyer paying in crypto and a seller desiring proceeds in fiat. The buyer uses crypto as payment to buy an asset through the ATS. The ATS converts the crypto into stablecoin (e.g., referring to an appropriate Crypto:Stablecoin currency pair or vice versa). Subsequently, the ATS converts the stablecoin to fiat (e.g., referring to an appropriate Fiat:Stablecoin currency pair or vice versa). The ATS sends fiat proceeds of the asset sale to the seller.

In another more specific aspect, an ATS settles a transaction between a buyer paying in fiat and a seller desiring proceeds in crypto. The buyer uses fiat as payment to buy an asset through the ATS. The ATS converts the fiat into stablecoin (e.g., referring to an appropriate Fiat:Stablecoin currency pair or vice versa). Subsequently, the ATS converts the stablecoin to crypto (e.g., referring to an appropriate Crypto:Stablecoin currency pair or vice versa). The ATS sends crypto proceeds of the asset sale to the seller.

The ATS can be configured to handle conversions between multiple different (e.g., M number of) cryptos and multiple different (e.g., N number of) stablecoins. In one aspect, an ATS is also configured to handle conversions between multiple different (e.g., L number of) fiats and multiple different (e.g., N number of) stablecoins. In a further aspect, an ATS is configured to handle conversions between multiple different (e.g., L number of) fiats, multiple different (e.g., M number of) cryptos and multiple different (e.g., N number of) stablecoins. Conversions can also include conversion between different currencies of the same currency type, such as, for example, between different fiats, different stablecoins, different cryptos, etc. The ATS may refer to appropriate currency pairs when converting between currencies.

For example, an ATS settles a transaction between a buyer paying in a first crypto and a seller desiring proceeds in second crypto. The buyer uses the first crypto as payment to buy an asset through the ATS. The ATS converts the first crypto into stablecoin (e.g., referring to an appropriate Crypto 1:Stablecoin currency pair or vice versa). Subsequently, the ATS converts the stablecoin into the second crypto (e.g., referring to an appropriate Crypto 2:Stablecoin currency pair or vice versa). The ATS sends second crypto proceeds of the asset sale to the seller.

In another example, an ATS settles a transaction between a buyer paying in a stablecoin and a seller desiring proceeds in crypto. The buyer uses the stablecoin as payment to buy an asset through the ATS. The ATS either stores the stablecoin or converts the stablecoin to another stablecoin. When converting from one stablecoin to another stablecoin, the ATS can refer to appropriate Stablecoin 1:Stablecoin 2 currency pair or vice versa. Subsequently, the ATS converts the stablecoin or the other stablecoin into the crypto. The ATS sends crypto proceeds of the asset sale to the seller.

As such, aspects of the invention can facilitate various scenario use cases:

Use Case 1: A user buys in crypto (e.g., XRP, Bitcoin, or Eth), that digital currency gets converted into stablecoin (e.g., Tether and/or Circle's USDC) based on the most stable at the time of transaction (ATS to determine and route transaction), converted to Fiat ($USD) for the seller. As described, an ATS can handle any "N" number of stablecoins and "M" number of cryptos.

Use Case 2: A user buys in Fiat ($USD), that fiat currency gets converted into stable coin (e.g., Tether and/or Circle's USDC) based on the most stable at the time of transaction (ATS to determine and route transaction), converted to crypto (e.g., XRP, Bitcoin, or Eth) for the seller.

Use Case 3: The user buys in one crypto (e.g., Bitcoin), and goes through the same process as in Use Case 1, but the seller wants to be paid in another crypto (e.g., XRP).

Accordingly, components of an ATS can take into account various considerations including, but not limited, to a seller wanting to sell digital shares and be paid in fiat ($), a buyer wanting to buy digital shares and pay in crypto (e.g., Bitcoin).

An example transaction flow can include buying an asset in crypto with sale proceeds in fiat. A seller can list shares (e.g., tokens) for sale at an ATS. The seller can link a fiat bank account to a corresponding ATS account (e.g., because they desire proceeds in fiat and would like to withdraw their funds). A buyer identifies the shares (e.g., tokens) for purchase. Buyer links their external crypto currency wallet (because they desire to pay with crypto) to a corresponding ATS account. The external crypto currency wallet may already include or subsequently be funded with crypto.

Buyer buys the shares and selects to pay in crypto. As part of the purchase, the buyer (possibly for a fee) can opt to convert crypto to stablecoin. The ATS accepts the buyers crypto. The ATS converts the crypto to stablecoin (e.g., referencing an appropriate currency pair). Conversion from crypto to stablecoin can occur immediately, essentially in real time, or within a specified time frame of seconds, milliseconds, microseconds, nanoseconds, etc. The ATS can compare stability characteristics of different stable coins and select a more stable (less volatile) stablecoin over some prior historical period (e.g., immediate past as well as recent).

Subsequently, the seller can request proceeds. In response to the seller request, the ATS converts the stablecoin to fiat (e.g., referencing an appropriate currency pair). Conversion from stablecoin to fiat can occur immediately, essentially in real time, or within a specified time frame of seconds, milliseconds, microseconds, nanoseconds, etc. The ATS disburses trade proceeds to the seller in fiat (possibly minus a fee). The ATS moves the shares (e.g., tokens) from the sellers ATS account (reducing the sellers holdings) to the buyers ATS account (increasing the buyers holdings).

The ATS stabilizes the transaction (i.e., reduces transaction volatility) by utilizing stablecoin. As such, the ATS has minimal, and potentially no, net change in value due at least in part to timely, seamless conversion of crypto→stablecoin→fiat.

The ATS can also stabilize transactions (i.e., reduce transaction volatility) of other currency combinations utilizing stablecoin. As such, the ATS has minimal, and potentially no, net change in value due at least in part to timely, seamless conversion of: (1) fiat→stablecoin→crypto, (2) crypto A→stablecoin→crypto B, (3) fiat→stablecoin A→stablecoin B, (4) stablecoin A→stablecoin B→crypto, (5) stablecoin A→stablecoin B→fiat, etc.

Accordingly, aspects of an ATS can be specifically configured and programmed to facilitate transactions using stablecoins. When the ATS performs a transaction, the ATS interacts with each party (e.g., buyer and seller) in their preferred currency. However, in one aspect, the ATS does not inform parties of currencies being used by other parties. As such, each party can interact with the ATS in their preferred currency without knowledge of a currency used by a counterparty. As such, each party may be blind the currency being used by the other party.

Different stablecoin types can have different characteristics. One type of stablecoin may have longer average transaction times compared to another form of stablecoin. There is a need for a technology platform that can create digital securities out of what are known as "real assets" to facilitate the support of multiple forms of crypto, stablecoin, and fiat to widen market reach, broaden customer demographic, and increase the user base. Furthermore, the enhanced flexibility of supporting various forms of crypto, stablecoin, and fiat, while taking into account each currencies associated characteristics to intelligently identify a route and distribution of achieving the buyer's/seller's currency preference, overcomes the inherent risk and volatility of certain cryptocurrencies.

In one aspect, the ATS includes a currency conversion engine. The currency conversion engine can identify an appropriate stablecoin for use in a transaction. The currency conversion engine can identify an appropriate stablecoin, from among a plurality of stablecoins, in essentially real-time based on a collection of factors including, but not limited to: the stability of each stablecoin, the stability of one or more other crypto currencies (e.g., used as backing for a stablecoin), size of the transaction, speed of the transaction, prior relationships, risk factors, chargebacks, KYC, etc. The currency conversion engine ingests relevant coin data for crypto and stablecoin, possibly along with relevant data for fiat currencies. The currency conversion engine also accesses stability derivation parameters. The currency conversion engine utilizes the coin data and derivation parameters to identify an appropriate stablecoin from among the plurality of stablecoins. In one aspect, the identified stablecoin has a requisite stability over time and/or has increased stability over one or more other stablecoins over time.

In another aspect, a coin characteristic module operates separately from the currency conversion engine. The coin characteristic module determines stablecoin characteristics, including stability, on an ongoing basis, at user selected times, in response to events, at defined intervals, etc. The coin characteristic module stores stability, possibly along with other characteristics, in stablecoin records for each of the plurality of stablecoins. The currency conversion engine accesses the stablecoin records when identifying an appropriate stablecoin for use in a transaction. Utilizing stablecoin records alleviates the currency conversion engine from having to perform ongoing, and possibly resource intensive, stablecoin stability calculations at or near the time of a currency conversion. Instead, the coin characteristic module may create, update, and modify stablecoin records during times of reduced resource usage.

During transaction performance, the currency conversion engine can identify an appropriate stablecoin (e.g., on demand and/or through reference to stablecoin records) to utilize for conversions. The currency conversion engine may convert a preferred currency (e.g., crypto) of the buyer to the identified appropriate stablecoin currency to reduce risk in fluctuations in currency valuations. After conversion to the appropriate stablecoin, the currency conversion engine may convert the appropriate stablecoin to the preferred currency (e.g., fiat) of the seller. The currency conversion engine can facilitate any of the other described currency conversion flows.

Transaction System

FIG. 1 illustrates an example transaction system 100 (e.g., a digital platform) including semi-redundant ledgers (primary ledger 102 and secondary ledger 104).

In aspects, system 100 is an Alternative Trading System (ATS). System 100 may automatically create and dynamically update (e.g., maintain) capitalization tables of assets underlying exchanged tokens, thereby addressing a long-standing pain point in businesses having investors for whom such capitalization tables must be manually created and revised whenever ownership changes occur. The automatic creation and live syncing maintenance of capitalization tables may facilitate their being continually up to date, complete, verified, and audit-ready (e.g., dynamically updated).

For example, system 100 may provide owners with a list of new investors in a tokenized asset based on the updated capitalization table, reflecting every buyer of the investors' tokens representing an interest in the underlying asset. System 100 may also provide value to the transfer side via improved efficiency and the reduction of manual pain points in their business. The ease and simplicity with which the systems and methods described herein may be applied in practice may provide compelling inducements for industries traditionally slow to adopt new technology, e.g., commercial real estate, to adopt the technology disclosed herein for facilitating transaction processing for the benefit of buyers and sellers of digital assets representing fractional ownership in underlying assets, system 100, sponsors of investments in assets and/or owners of assets (e.g., real estate) may provide access to investments in such assets which may have previously been unavailable, for example, due to securities regulations and/or rules defining sophisticated and accredited investors.

Retail investors and buyers of assets have traditionally been locked out of participating in commercial real estate investments because they lack the minimum investment threshold and/or do not have sufficient qualifications as traditional investors to acquire an interest in an asset from a Seller of the interest in the asset. System 100 may establish a secondary exchange via which the asset tokens are exchanged in secondary trades, following any holding periods following the primary issuance of securities underlying the asset tokens as may be required by securities regulations (e.g., Rule 144), so the restrictions of the securities regulations pertaining to qualifications of the investors may not apply to the contemplated exchange of asset tokens. For example, system 100 may unlock real estate investment opportunities for retail buyers, not only facilitating retail buyers to capture return on investment, but also to take advantage of potential tax savings, for example, via write-offs of depreciation of the underlying assets on tax returns.

The disclosed technology can create digital securities out of what are known as "real assets" and can function as a secondary market platform or Financial Exchange for these types of assets as well as for other types of assets such as, but not limited to, investments in real estate, investments in franchises, investments in business that generate dividends or returns based on performance of the business or underlying asset, investments in ventures that capture or mine natural resource such as, but not limited to uranium, timber, and other commodities, private credit, private debt, intangible assets, tradeable assets, and any other types of appropriate assets.

As depicted, system 100 includes owner 112, seller 114, and buyer 116. Each of owner 112, seller 114, and buyer 116 may include computing and communication resources and systems (e.g., an owner device, a seller device, and a buyer device, respectively) corresponding to and/or representing users interfacing with system 100. Owner 112 may be an owner of an asset listed on the transaction platform and/or a sponsor of investments in an asset listed on the transaction platform, and may also be referred to as an asset owner or a property owner.

Seller 114 may represent one who is selling or listing an asset as available for sale or exchange, e.g., available to be transferred to another user in exchange for something else (e.g., tokens, currency, etc.). Seller 114 may also be referred to as a seller when participating in a buy-sell transaction, for example.

Buyer 116 may represent one who is seeking to purchase, buy, or acquire at least a partial interest in an asset which is listed (e.g., as available for sale or exchange) on the transaction platform. Buyer 116 may also be referred to as a buyer when participating in a buy-sell transaction, for example.

System 100 may perform verification of identification and related information for each of the users of the system 100 (e.g., including owner 112, seller 114, and/or buyer 116) via an online identity verification process, for example, a know your customer (KYC) verification process for an individual user, a know your business (KYB) verification process for any business entity, such as, but not limited to, limited liability company (LLC), C corporation, S corporation, and other appropriate business entities, and/or an anti-money laundering (AML) verification process.

System 100 provides mechanisms for transmitting and/or receiving transfer of various fiat, crypto, and stablecoin currencies as well as other digital content and digital assets, (e.g., digital bits and/or bytes storable in a computer-readable memory of the system 100) over a computing communication system associated with the system 100. Each user of system 100 may have a user account at system 100. Each user can digitally/electronically link their user account at system 100 to one or more computer-networked external financial accounts. The financial accounts can be a source for funding purchases and/or a location to receive proceeds. System 100 can use digital, electronic, and/or computer-networked communication to withdraw from and deposit to financial accounts. In one aspect, user accounts at system 100 include internal financial accounts linked to the corresponding external financial accounts. For example, a user of system 100 can have internal account for USD linked to an external bank account for USD. Similarly, a user of system 100 can have an internal account for BTC linked to an external BTC wallet.

Generally, per user, system 100 can include linkages between a variety of different internal financial accounts and corresponding external financial accounts, including any of: fiat accounts, crypto accounts, and stablecoin accounts. Accounts can include, but are not limited to: financial institution accounts, bank accounts, credit union accounts, investment accounts, crypto accounts, crypto wallets, stablecoin wallets, digital asset wallets, other provider or recipient of digital currency representations and/or digital assets associated with a transaction processed by system 100, etc.

As such, a buying party to transaction can utilize any of fiat, crypto, or stablecoin for an asset purchase. Similarly, a selling party to a transaction can utilize any of fiat, crypto, or stablecoin to receive proceeds. In some embodiments, the asset bought/sold in a transaction is a digital asset. Digital assets may include, but are not limited to: crypto, stablecoin, crypto tokens, crypto coins, security tokens, asset tokens, non-fungible tokens (NFTs), fungible tokens, and/or other appropriate forms of digital assets. Thus, in some aspects, one form of digital asset is used to purchase another form of digital asset or proceeds for sale of a digital asset are transferred to a seller in the form of another digital asset. For example, crypto can be used to purchase a token representing a share in an apartment building. In another aspect, proceeds of the sale of a token representing a share in a franchise are transferred to a seller in stablecoin.

Accordingly, a buy/sell transaction implemented at system can include: (1) some amount of a buyer side currency type selected from among fiat, crypto, or stablecoin, (2) a subject asset, and (3) some amount of a seller side currency type selected from among fiat, crypto, or stablecoin. In aspects, the subject asset is any of the described digital assets.

Thus, in some aspects, (and in addition to trading tokens representing fractionalized interests in real assets) system 101 can perform currency trading utilizing various internal and/or external financial accounts of a buyer and of a seller. For example, a buyer can utilize an amount of a first form of crypto (buyer side currency type) to purchase an equally valued amount of a second form of crypto (subject asset) from a seller. However, the seller may desire proceeds of the sale in fiat or stablecoin (the seller side currency type). The buyer can receive the amount of the second form of crypto in exchange for the amount of the first form of crypto. The seller can receive an equally valued amount of fiat or stablecoin as proceeds in exchange for the amount of the second form of crypto.

In another example, a buyer can utilize an amount of fiat (buyer side currency type) to purchase an equally valued amount of a first form of crypto (subject asset) from a seller. However, the seller may desire proceeds of the sale in a second form of crypto or stablecoin (the seller side currency type). The buyer can receive the amount of the first form of crypto in exchange for the amount of fiat. The seller can receive an equally valued amount of a second form of crypto or the stablecoin as proceeds in exchange for the amount of the first form of crypto.

Sending and/or distributing fees and/or funds, receiving and/or collecting fees and/or funds, and exchanging (e.g., digital) assets for fees and/or funds as described herein are merely illustrative examples of the technological systems and methods which may be applied in addressing challenges in a variety of other contexts and applications, also. For example, the technological systems and methods described herein may provide novel systems and methods for transmitting and/or receiving transmissions of various types of digital content and/or digital assets (e.g., digital bits and/or bytes storable in a computer-readable memory of the system 100) over a computing communication system associated with the system 100.

In various non-limiting examples, including those described herein, the digital content and/or digital assets transmitted and/or received by components of the system 100 and corresponding methods described herein may include digital representations of currency, crypto, stablecoin, NFTs, and/or digital assets such as written works, artwork, photographs, audio/video programs, music, digital blueprints, computer-aided design (CAD) files representing physical articles of manufacture, architectural designs, plats of survey, deeds to real property, stock and/or membership interests in business entities, tokens representing stock and/or interests in digital or real assets, executed contracts, ownership and/or membership interests in timeshare properties, co-op properties, travel/vacation clubs, recreational clubs, social clubs, etc. Additional examples of content could be valuation estimates, third party appraisals, proof of purchases, copies of insurance policies, profit and loss data, calendars and schedules, and performance data.

As depicted, system 100 includes primary ledger 102 (e.g., a private mutable ledger), secondary ledger 104 (e.g., a public immutable ledger), transfer agent 106, asset tokenization module 108, backend servers 132, website 134, and pricing oracle 136. While primary ledger 102 and transfer agent 106 are depicted as separate, it should be understood that, in certain aspects, primary ledger 102 and transfer agent 106 are included within the same service. The users may interact with website 134 via a web browser app executing on computing devices of owner 112, seller 114, and buyer 116, all of which can be, but is not limited to, a desktop computer, laptop computer, tablet computer, personal digital assistant (PDA), cell phone, mobile phone, smart phone, and/or other computing devices including mobile devices.

Website 134 can transfer user-interface data to and/or from computing devices corresponding to owner 112, seller 114, and buyer 116. Web browser apps at computing devices corresponding to owner 112, the seller 114, and the buyer 116 can process the user-interface data and present a corresponding user-interface. The user-interface data and user-interfaces can be tailored per user based on how a user is participating in a transaction, such as, for example, as an owner, a seller, or a buyer. For example, a seller and a buyer may get different user-interfaces, one user-interface with data relevant to selling a fractional interest in an asset and another user-interface with data relevant to purchasing the fractional interest in the asset respectively.

System 100 may be communicatively coupled with transaction ATS broker/dealer module 130, pricing oracle 136, and secondary ledger 104. While, in some aspects, primary ledger 102 is described as being centralized and secondary ledger 104 as being decentralized (e.g., distributed), it should be understood that primary ledger 102 could be decentralized. Primary ledger 102 and/or secondary ledger 104 may be implemented with blockchain technology. Primary ledger 102 and secondary ledger 104 may be private or public. Primary ledger 102 and secondary ledger 104 may include multiple copies of ledgers maintained on different computing nodes of computing networks implementing and/or supporting one or more public blockchain protocols, for example, but not limited to, Ethereum, Bitcoin, Binance Smart Chain (BSC), Cardano, Polkadot, Solana, Chainlink, Cosmos, TRON, HIVE, Polygon (Matic Network), and more.

In certain aspects, primary ledger 102 can store user personally identifiable information (PII) utilized by the system 100, as well as a capitalization table (also referred to as a cap table). The capitalization table maintains the status of platform assets and transactions, including the capitalization of each asset (e.g., real property) listed on the platform (e.g., listed as available for transactions on the platform). Primary ledger 102 may be implemented as a Structured Query Language (SQL) or other database, for example.

In some aspects, primary ledger 102 is maintained by transfer agent 106. The function of transfer agent 106 may be unregulated. Transfer agent 106 can record transactions and/or transaction data in primary ledger 102. Transactions and/or transaction data in primary ledger 102 can be (e.g., automatically) semi-redundantly synchronized to secondary ledger 104. For example, transfer agent 106 can (e.g., semi-redundantly) synchronize primary ledger 102 and secondary ledger 104. In some aspects, semi-redundant synchronization occurs automatically in accordance with synchronization rules, such as, for example, removing PII prior to synchronization. Further, transfer agent 106 may act as a gatekeeper and share information regarding transactions on primary ledger 102 and/or secondary ledger 104 only with authorized users and/or transaction ATS broker/dealer module 130.

In combination, primary ledger 102 and/or secondary ledger 104 can be utilized to automatically and digitally preserve evidence of transaction completion. Upon transaction completion (e.g., settlement), transaction related data can be (automatically) recorded to primary ledger 102 (e.g., a private mutable ledger). At least a subset of the transaction related data can be semi-redundantly (and automatically) synchronized from primary ledger 102 to secondary ledger 104 (e.g., a public immutable ledger, such as, a block chain).

Transaction ATS broker/dealer module 130 may include computing and communication resources and systems corresponding to and/or representing a registered broker, registered dealer, registered broker/dealer licensed by the US Securities and Exchange Commission (SEC), the Financial Industry Regulatory Agency (FINRA), other domestic/international regulatory or governmental agencies, and/or similar roles in various exemplary applications and/or jurisdictions in which the system 100 is utilized. Transaction ATS broker/dealer module 130 may interface with the system 100 to provide associated broker/dealer functionality on system 100.

Functionality provided by the transaction ATS broker/dealer module 130 may be separate from functionality provided by other modules of system 100, for example, due to regulatory requirements including those promulgated by the Financial Industry Regulatory Authority (FINRA). In one aspect, transaction ATS broker/dealer module 130 may include an Alternative Trading System (ATS) and implementations (e.g., software, firmware, programmable logic arrays, electronic circuitry, etc.) of FINRA-compliant processes and methods for facilitating the transactions processed by the transaction platform as approved and licensed by FINRA.

In one aspect, ATS broker/dealer module 130 also includes conversion components (e.g., a currency conversion engine, a coin characteristic module, etc.) facilitating currency conversions in accordance with any of the described currency conversion flows.

The conversion components can determine an appropriate stablecoin currency available based on a collection of factors including, but not limited to: the stability of each digital currency, size of the transaction, speed of the transaction, prior relationships, risk factors, chargebacks, and KYC. The conversion components communicate with backend servers 132 to provide respective amounts of crypto currency, stablecoin, or fiat required for a transaction. The conversion components may include a coin characteristic module that derives stablecoin characteristic that are in turn utilized to determine stablecoin stability. The conversion components may also communicate with the transaction ATS broker/dealer 130 to obtain applicable rules to be used in the determination of an appropriate stablecoin and currency conversion flow. There may be rules or regulations prohibiting certain currencies for a respective transaction. For example, an asset class may be restricted in the currencies available for transaction based on certain regulations and requirements. There may also be regional considerations. For instance, if a state opts out of certain agreements, then they would be restricted from certain transactions and currencies.

Functionality provided by transaction ATS broker/dealer module 130 may be implemented in a virtual private cloud separate from other modules of system 100. Firewalls may be established for transaction ATS broker/dealer module 130 to be separate from and/or on a separate web services instance than other modules of system 100. Transaction ATS broker/dealer module 130 may provide functionality to introduce buyers 116 and sellers 114 to each other, to present user-interfaces, to allocate resources, to release allocated resources, to generate smart contracts, to settle transactions facilitated by system 100, to convert currencies, to determine coin characteristics, to distribute fees associated with the transactions facilitated by the transaction platform to appropriate participants in system 100, and/or to act as a gatekeeper of transactions facilitated by the transaction platform.

Smart contracts are digital contracts that automatically execute, control or document events and actions according to the terms of a contract or an agreement. Fees generated from activities on system 100 during an acquisition/transfer transaction (e.g., buy-sell transaction, acquisition transaction, merger transaction, etc.) may be collected and/or distributed by transaction ATS broker/dealer module 130, for example, according to rules, agreements, and/or smart contracts associated with the transaction facilitated by the transaction platform. Fees generated from activities and/or participants of system 100 outside transaction ATS broker/dealer module 130 (e.g., from other participants of the transaction platform and/or any third-party system that is not included in system 100) may be processed and collected by components of system 100.

Transaction ATS broker/dealer module 130 may request payment of fees (e.g., fees associated with a transaction facilitated by components of system 100) via third-party custody account(s) of the buyer 116. Transaction ATS broker/dealer module 130 may deduct funds sufficient to cover the fees from proceeds of the transaction to pay seller fees (e.g., fees payable to the seller 114) as stipulated by and/or agreed to by the seller 114 in a smart contract associated with the transaction as part of a process of listing a token as available for an exchange transaction facilitated by system 100.

A computing system of the third-party custody account(s) may send funds to cover the fees to transaction ATS broker/dealer module 130 at which time transaction ATS broker/ dealer module 130 may keep the funds covering the fees. Transaction ATS broker/dealer module 130 may disburse funds covering a licensing fee for system 100 to one or more entities due those fees. Transaction ATS broker/dealer module 130 may disburse funds covering a partnership fee to the transfer agent 106. Transaction ATS broker/dealer module 130 may generate and/or distribute a final settlement statement to the buyer 116 and seller 114. In the event of any errors, omissions, glitches, or problems associated with the transaction processed by system 100, transaction ATS broker/dealer module 130 may notify a designated third party of the event for appropriate remediation. Transaction ATS broker/dealer module 130 may include one or more maintenance and support modules via which remediation, updates, upgrades, and/or support may be provided via a third-party computing system communicatively coupled with transaction ATS broker/dealer module 130.

Fees may be converted between and/or transferred to and/or from accounts in any of the described currencies.

Pricing oracle 136 may include a third-party service that connects smart contracts formulated in system 100 with third-party entities and third-party systems outside of system 100. Pricing oracle 136 may provide a user of system 100 with an estimate of the current value of an asset. Pricing oracle 136 may facilitate calculations and computations based on the estimate as directed by the user. The user may modify inputs to pricing oracle 136 to utilize pricing oracle 136 for determining the user's own market pricing estimates. For example, buyer 116 may modify inputs to pricing oracle 136 to utilize pricing oracle 136 for estimating a future value of their investment in an asset and determining an amount of funds buyer 116 may agree to exchange for the asset on a given day. Seller 114 may transmit information indicating agreement with pricing data provided by pricing oracle 136, or seller 114 may transmit information that overrides the pricing data provided by pricing oracle 136. For example, in the context of commercial real estate assets, pricing oracle 136 may include a digital broker opinion of value (BOV).

In an example, owner 112 (e.g., a real estate property owner) may authenticate with system 100 according to KYB KYC AML 118 protocols and methodologies. Owner 112 may link bank account 140 and currency custody module 142 to system 100. Currency custody module 142 may serve as a custodian for owner 112's currency on system 100. Currency custody module 142 may be configured to hold fiat currency, for example, US dollars ($) or other forms of fiat currency. Optionally, or concurrently with linking bank account 140 and currency custody module 142, owner 112 may link a crypto wallet and crypto custody module to system 100. The crypto custody module may serve as a custodian for owner 112's crypto on system 100. The crypto custody module may be configured to hold crypto, for example, Bitcoin (BTC) or other forms of crypto. Platform digital wallet custody module 144 may serve as a custodian for owner 112's digital assets on system 100, such as, for example, tokens representing ownership interests in businesses, tokens representing ownership interests commercial real estate, etc.

In the example, seller 114 may authenticate with system 100 according to KYB KYC AML 120 protocols and methodologies. In some examples, owner 112 and seller 114 may be the same individual or entity playing the different roles in a transaction, while in other examples, owner 112 and seller 114 may be different individuals or entities, for example, if seller 114 is a broker or agent engaged by owner 112 to list and/or transfer the property on system 100 on their behalf. Seller 114 may link bank account 148 and currency custody module 150 to system 100. Currency custody module 150 may serve as a custodian for seller 114's fiat currency on system 100.

Crypto custody module 157 may serve as a custodian for seller 114's crypto currency on system 100. Crypto custody module 157 may be configured to hold crypto currency, for example, Bitcoin (BTC), USDC, or other forms of crypto currency including other stablecoin. Crypto custody module 157 may authenticate with system 100 according to wallet KYC 159 protocols and methodologies. Crypto custody module 157 may also include functionality and/or an interface to convert or exchange crypto currency held thereby into fiat currency or different crypto currency (including stable coin) for the benefit of seller 114. Crypto custody module 157 can interoperate with a currency conversion engine and/or a coin characteristics module (potentially included in transaction ATS broker/dealer 130) to facilitate crypto currency conversions or exchanges. Conversions or exchanges of the crypto currency held by digital wallet custody module 157 to fiat currency or other crypto currency may be documented by a transaction entry in primary ledger 102 and/or secondary ledger 104.

Platform digital wallet custody module 152 may serve as a custodian for seller 114's digital assets on system 100, such as, for example, tokens representing ownership interests in businesses, tokens representing ownership interests commercial real estate, etc. Platform digital wallet custody module 152 can serve as custodian for digital assets which seller 114 transfers on behalf of a separate owner (e.g., via a broker or agency relationship) and the digital assets which seller 114 transfers on its own behalf as also owner 112 of the digital assets.

Asset tokenization module 108 may generate one or more digital assets, for example, tokens, representing fractional ownership in an asset and/or a value of an asset, for example, a real estate property owned by owner 112, and store the generated digital assets (e.g., tokens) in asset wallet custody module 146. Asset wallet custody module 146 may transmit data to and/or recording generation of digital assets (e.g., tokens) at primary ledger 102 and/or secondary ledger 104. Asset wallet custody module 146 may transmit the digital assets (e.g., tokens) to owner 112's platform digital wallet custody module 144 and provide data to transfer agent 106 to record in the primary ledger 102 regarding the creation and/or transfer of the digital assets (e.g., tokens) generated by asset tokenization module 108. Data recorded to primary ledger 102 can be (e.g., automatically) semi-redundantly synchronized to secondary ledger 104.

Asset wallet custody module 146 may transmit an invitation to seller 114 to claim the digital assets (e.g., a token representing a fractional interest in a real asset) generated by asset tokenization module 108. When seller 114 claims or retrieves its associated portion of the digital assets generated by asset tokenization module 108 that is stored in asset wallet custody module 146, for example, if seller 114 is going to trade its associated portion of the digital assets generated by asset tokenization module 108 on system 100, then asset wallet custody module 146 may transmit the digital assets to seller 114's platform digital wallet custody module 152 and transmit information regarding the transfer to transfer agent 106 for recording on the primary ledger 102 (with, for example, automatic, semi-redundant synchronization to secondary ledger 104). In some aspects, instead of transmitting an invitation to seller 114, asset wallet custody module 146 can transmit the digital assets generated by asset tokenization module 108 directly to seller 114's asset wallet custody module 146.

In an example, buyer 116 may authenticate with system 100 according to KYB KYC AML 122 protocols and methodologies. Buyer 116 may link bank account 154 and currency custody module 156 to system 100. Currency custody module 156 may serve as a custodian for buyer 116's fiat currency on system 100.

Crypto custody module 158 may serve as a custodian for buyer 116's crypto currency on system 100. Crypto custody module 158 may be configured to hold crypto currency, for example, Ethereum (ETH), Tether, USDC, or other forms of crypto currency including other stablecoin. Crypto custody module 158 may authenticate with system 100 according to wallet KYC 160 protocols and methodologies. Crypto custody module 158 may also include functionality and/or an interface to convert or exchange the crypto currency held thereby into fiat currency or different crypto currency for the benefit of buyer 116. Crypto custody module 158 can interoperate with a currency conversion engine and/or a coin characteristics module (potentially included in transaction ATS broker/dealer 130) to facilitate crypto currency conversions or exchanges. Conversions or exchanges of the crypto currency held by crypto custody module 158 to fiat currency or other crypto currency may be documented by a transaction entry in primary ledger 102 and/or secondary ledger 104.

Platform digital wallet custody module 162 may serve as a custodian for buyer 116's digital assets on system 100, for example, such as, for example, tokens representing ownership interests in businesses, tokens representing ownership interests commercial real estate, etc. Tokens in platform digital wallet custody module 162 may have previously been generated by asset tokenization module 108 and represent fractional interests in assets, such as, for example, real assets.

In an example, buyer 116 may see (e.g., in a presented user-interface) that seller 114 has listed one or more digital assets (e.g., one or more tokens each representing a fractional interest in a real asset) for sale. The one or more digital assets may have been generated by asset tokenization module 108, transferred through asset wallet custody module 146, and stored in platform custody wallet 152. In one aspect, the one or more digital assets are listed on website 134 that is accessed by buyer 116.

Buyer 116 can engage in a transaction to purchase the one or more digital assets. The transaction can be processed by system 100 to exchange fiat currency via currency custody module 156 and/or crypto via crypto custody module 158 for the one or more digital assets (e.g., the one or more tokens each representing a fractional interest in a real asset). Seller 114 may receive fiat currency from currency custody module 156 into currency custody module 150 and/or crypto from crypto custody module 158 into crypto custody module 157. Buyer 116 may receive the one or more digital assets from platform digital wallet custody module 152 into platform digital wallet custody module 162. Evidence regarding the transfer and settlement of the transaction can be transmitted to and recorded on primary ledger 102 as well as on secondary ledger 104. In one aspect, data is recorded on primary ledger 102 and subsequently semi-redundantly synchronized to secondary ledger 104.

In aspects, one or more of website 134, backend servers 132, transaction ATS broker/dealer 103 and transfer agent 106 interoperate with one another as well as with relevant currency accounts, currency wallets, currency custody modules, platform digital wallet modules, etc. to perform and settle a transaction. The one or more of website 134, backend servers 132, transaction ATS broker/dealer 103 and transfer agent 106 can interoperate transferring a digital asset (e.g., a token representing a fractional ownership interest) between platform digital wallet modules and transferring currencies between relevant custody modules (e.g., fiat, crypto currency, etc.).

Thus, in aspects, crypto currency custody modules and/or (fiat) currency custody modules interoperate with a currency conversion engine internal to and/or spanning website 134, backend servers 132, transaction ATS broker/dealer 103 and transfer agent 106. The currency conversion engine facilitates crypto based transactions in a manner that mitigates risk associated with crypto volatility. As such, system 100 may provide functionality to shield and insulate buyers and sellers from the preferred currency of a counter party. However, exchanges of one cryptocurrency to another cryptocurrency, or fiat may not happen instantaneously. Due at least in part to the delay in exchange, a crypto value at the time a buyer agrees to purchase a digital asset can (potentially drastically) differ from the crypto value at the time of exchange. The conversion engine can convert the buyer's crypto to an appropriate stablecoin, which is then subsequently converted to the seller's preferred currency (e.g., another crypto or fiat). Conversion to and/or from stablecoin significantly reduces currency volatility relative to crypto.

In one example, buyer 116 and seller 112 agree to a transaction transferring a digital asset (e.g., a token representing a fractional ownership interest) currently held in platform digital wallet custody module 152 from seller 112 to buyer 116 for an agreed to price. Buyer 116 may prefer crypto (e.g., XRP, Bitcoin, Etheruem, etc.) and seller 112 may prefer fiat (USD). Website 134 can present the sale price to buyer 116 in crypto and can present the sale price and/or resulting proceeds to seller 112 in fiat.

Buyer 116 initiates payment for a digital asset using an amount of crypto. The amount of crypto is transferred from crypto custody module 158 to the currency conversion engine. The currency conversion engine identifies an appropriate stablecoin using any of the described mechanisms. The conversion engine, potentially through reference to a corresponding currency pair, converts the amount of crypto to an equally valued amount of the appropriate stablecoin. Subsequently, the conversion engine, potentially through reference to another corresponding currency pair, converts the amount of stablecoins to an equally valued amount of fiat. The amount of fiat is transferred to conversion engine into currency custody module 150. The digital asset is transferred from platform digital wallet custody module 152 to platform digital wallet custody module 162. When appropriate, relevant fees (e.g., conversion fee, service fee, etc.) can be taken from the sale price in a currency preferred by system 100 prior to transferring trade proceeds to currency custody module 150.

Figure 2:
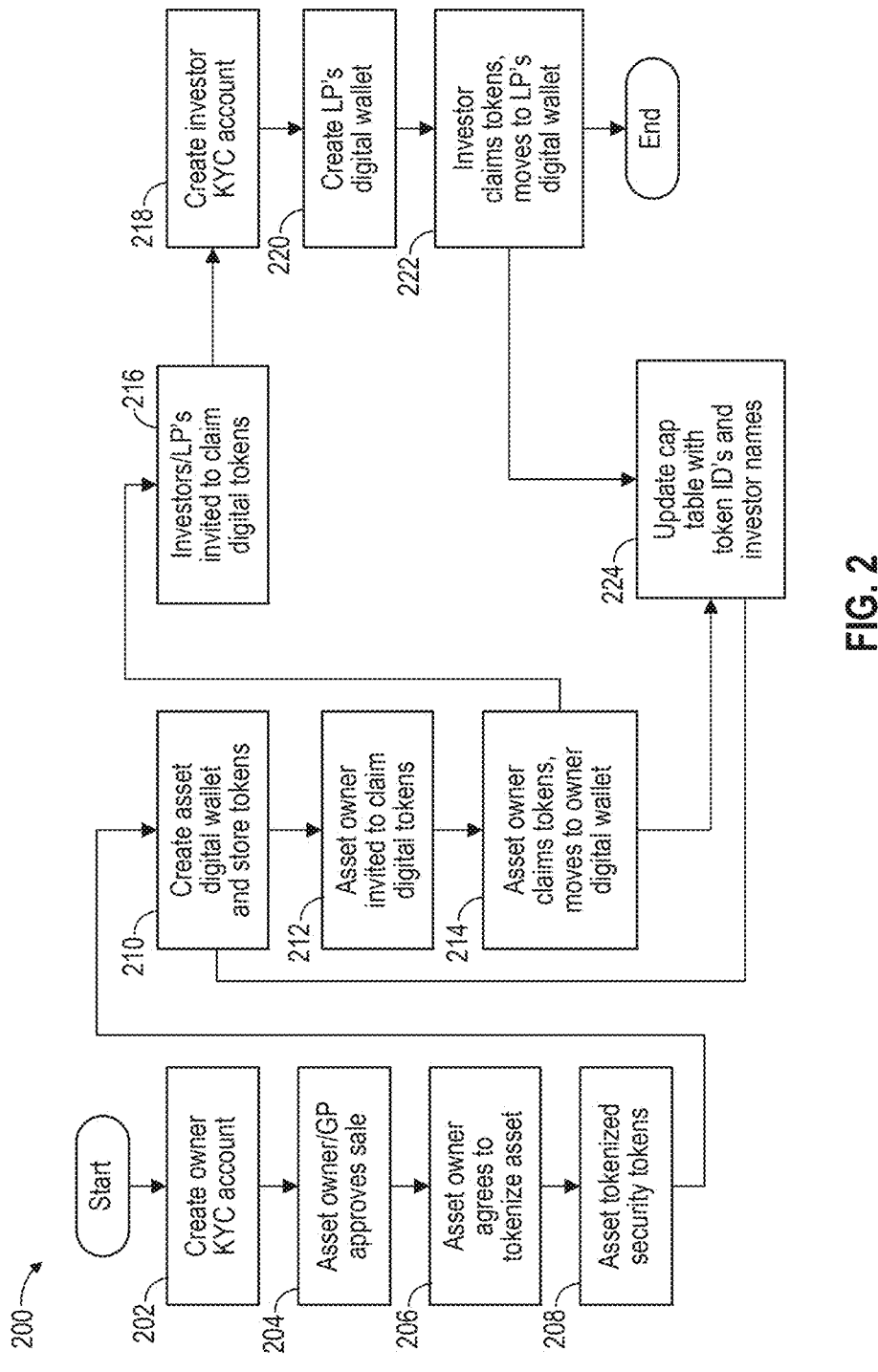
FIG. 2 illustrates an exemplary process for tokenization of an asset, according to some embodiments of the disclosed technology.

FIG. 2 illustrates an exemplary process 200 for tokenization of an asset, according to some aspects of the disclosed technology. Process 200 can be implemented using the components of system 100. For example, one or more tokens can be created, each token representing a fractional interest in an asset. There are at least two types of participants in process 200. One is an owner, (e.g., an asset holder), such as the owner 112, who may also be referred to as a sponsor or general partner (GP). The other is an investor, also referred to as a limited partner (LP). The investor may be a current investor in the asset or an investor who wants to invest in the asset. The investor may also be referred to as the buyer, such as buyer 116.

Initially (e.g., at or prior to "START"), the participants (e.g., users) may be onboarded with system 100 as discussed with reference to FIG. 1, and process 200 that the participants undergo to become onboarded with system 100 is described in detail below. For example, the owner (e.g., may be GP) may undergo a KYB process and a KYC account for owner 112 may be created with system 100 (operation 202). Owner 112 may approve sale of the asset using the system 100 (operation 204) to generate a smart contract memorializing agreement to sell and list.

After owner 112 agrees to tokenize (fractionalize interests in) an asset (operation 206), system 100 may tokenize the asset as security tokens (operation 208), for example, or as other digital assets including, but is not limited to, nonfungible tokens (NFTs), fungible tokens, hybrid tokens, crypto currencies, crypto tokens, crypto coins, security token, and asset tokens, having metadata including identification information of the buyer of the NFTs. The security tokens may include, for example, ERC 1400 tokens. The security tokens may be fungible tokens or non-fungible tokens, which are unique and differentiated from other tokens representing a share of value in the asset, and may store associated meta data. In various examples, other digital asset types may be used. The security tokens created may include tokens designated as being owned by the GP and tokens owned by each of the investors or LPs who also hold an interest in the asset.

In the example of FIG. 2, an asset having a net value of $1,000,000 may be tokenized as 1,000 tokens, each token having a value of $1,000. In this example, the net value of the asset may be taken into account any debt by which the asset is burdened. In other words, an asset having a market value of $2,000,000, and a mortgage securing a debt of $1,000,000 recorded as a lien against the asset, may have a net value of $1,000,000. An asset having a market value of $1,000,000, and no debt against the asset, may have a net value of $1,000,000.

These tokens may be sent by transfer agent 106 to a platform digital wallet, such as platform digital wallet custody module 152, created for the asset (operation 210), and the capitalization table for the asset may be updated by transfer agent 106 to reflect moving the tokens (operation 224). An identification number (ID) identifying the unique tokens may be included in the capitalization table along with the token's owner or investor's identification information. The platform digital wallet may be held by system 100 or a third party.

System 100 may invite the GP to claim the tokens (operation 212). When the GP claims the tokens, they may be moved from the platform wallet to the GP's digital wallet (operation 214), and the capitalization table may be updated to reflect the move (operation 224). The tokens claimed by the GP are only the GP's tokens, not investors' (LP's) tokens. The GP may then invite the investors (LPs) to claim their tokens (operation 216). Once the LPs claim their tokens, the LPs may be free to conduct transactions on system 100 using the tokens, for example, transferring their tokens or exchanging their tokens for other items of value, for example, other tokens representing interests in other assets.

If an LP who wishes to claim their tokens is not registered or onboarded onto system 100, the LP may undergo a KYC process to create an investor account with the platform on the system 100 (operation 218) and create the LP's digital wallet (operation 220). The LPs may then claim their tokens, which may then be moved from the platform asset digital wallet (which may have been holding the tokens since they were created in operation 208) to the LP wallets (operation 222), and the capitalization table may be updated to reflect the moves (operation 224). For example, the capitalization table may associate the token identifiers (IDs) with the names of the LPs.

When the capitalization table is updated (operation 224), system 100 can record the updated capitalization table may be updated in primary ledger 102 and/or secondary ledger 104 (blockchain). In one aspect, system 100 records an updated capitalization table to primary ledger 102. The system 100 may also automatically update (e.g., semi-redundantly synchronize) secondary ledger 104 to correspond with primary ledger 102. PII about the GP or LPs may be withheld from and not stored in secondary ledger 104. For example, instead of an LP name, the secondary ledger may associate token IDs with a hash value that is unique to the LP. In this manner, a blockchain transaction at secondary ledger 104 may be linked to the LP, while the LP may remain anonymous. The primary and secondary ledgers 102, 104 may be correlated using a database within system 100.

Figure 3:
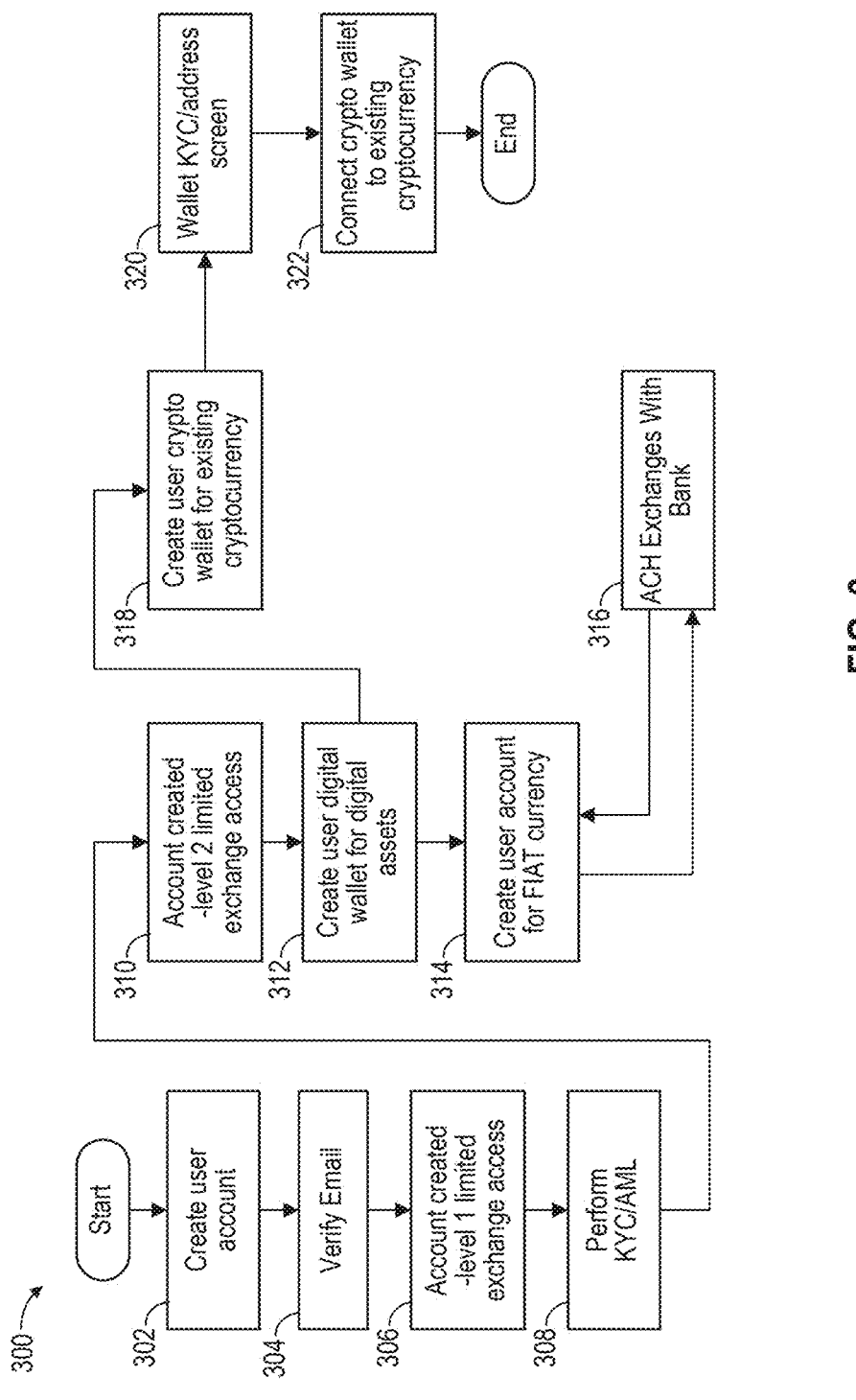
FIG. 3 illustrates an exemplary process for user onboarding and account creation, according to some embodiments of the disclosed technology.

FIG. 3 illustrates an exemplary process 300 for user (e.g., owner 112, seller 114, or buyer 116) onboarding and account creation, according to some aspects of the disclosed technology. Process 300 can be implemented using the components of system 100. For a new user, e.g., the owner 112, seller 114, or buyer 116, system 100 may first perform a light account creation with the user's name, email address, and password (operation 302). System 100 may then verify the user's email address (operation 304), for example, by emailing a verification link to the user's email address, which the user may click or follow to verify the user's email address with the platform.

After successful email verification, system 100 may perform a level 1 account creation for the user (operation 306). The level 1 account may provide limited access to system 100, for example, authorizing the user to browse tokenized assets, but not to acquire or exchange the tokens created to represent the tokenized assets.

A user may gain level 2 access by successfully completing the KYB/KYC/AML process (operation 308). System 100 may create a level 2 access account for the user to provide the user with full exchange access (operation 310), which may include all access of the level 1 access plus full access to the exchange, for example, authorizing the user to acquire and/or exchange tokens created to represent tokenized assets. Upon successful completion of the KYB/KYC/AML process, system 100 may also allocate computing resources (e.g., system memory resources, storage resources, network resources etc.) for the creation of digital wallets. Using the allocated computing resources, system 100 can create multiple digital wallets or financial holdings accounts for the user. Level 2 account creation can include a user indicating one or more desired (or preferred) currencies (e.g., crypto, fiat, stablecoin) to use for transaction settlement when participating in transactions at system 100.

For example, system 100 can create a digital wallet (e.g., 144, 152, 162, etc.) to hold digital assets, such as, tokens representing fractional ownership interests (operation 312), a fiat account to hold fiat currency (e.g., 142, 150, 156) (operation 314), and a crypto currency wallet to hold crypto currency (operation 318). The user's digital wallet can be used to receive, transmit, hold, etc. tokens (e.g., asset tokens representing fractional interests in an asset) generated by system 100 and from/to other user digital wallets at system 100. The user's crypto currency wallet may receive and/or transmit crypto currency from/to crypto currency wallets and/or accounts off system 100.

The user's fiat account can be used to receive and/or transmit fiat from/to digital fiat accounts/currency wallets and/or accounts off of system 100. The user may fund the user's fiat account, for example, via an ACH transfer or ACH exchange with a bank or other financial institution (operation 316). The user may also transfer fiat currency from the user's fiat account on system 100 to a bank or other financial institution external to the system 100 via an ACH transfer (operation 316).

The user's crypto currency wallet can be used to receive and/or transmit crypto from/to crypto accounts/crypto currency wallets and/or accounts off of system 100. The user may fund the user's crypto currency wallet, for example, via appropriate digital transfers. The user may also transfer crypto currency from the user's crypto currency wallet on system 100 to external crypto wallets or other crypto accounts external to the system 100 via approbative digital transfers (operation 316).

Such a user may first successfully complete a wallet know-your-customer (KYC) process, such as a security process, and address screen (operation 320) to ensure the authenticity and security of the user's existing cryptocurrency. System 100 may then connect the crypto currency wallet to an external cryptocurrency digital wallet for the user (operation 322) based on determining that the authenticity and security are proper. The user may then transfer cryptocurrency from an off-platform crypto currency wallet to the user's on-platform crypto currency wallet. In certain aspects, the security process is continually monitoring the crypto currency wallet to determine proper authenticity and security.

A level 2 account may grant a user privileges to participate in transactions to acquire, sell, and exchange tokens on system 100. As part of transactions, currency (crypto, stablecoin, fiat) can be transferred between relevant currency custody modules and converted and tokens transferred between platform digital wallet custody modules 152.

In some aspects, the user's account(s) on the system 100 may earn dividends, and the earned dividends may be moved into the user's fiat account when in the form of fiat currency or into the user's crypto currency wallet when in the form of a cryptocurrency. Note that on system 100, asset tokens may be purchased by and/or sold for any or a variety of different forms of fiat currency and/or crypto currency, or combinations thereof. Likewise, in such aspects, the dividends may be earned and paid to a user's account in a variety of different forms of fiat currency and/or cryptocurrency, or combinations thereof.

Figure 4:
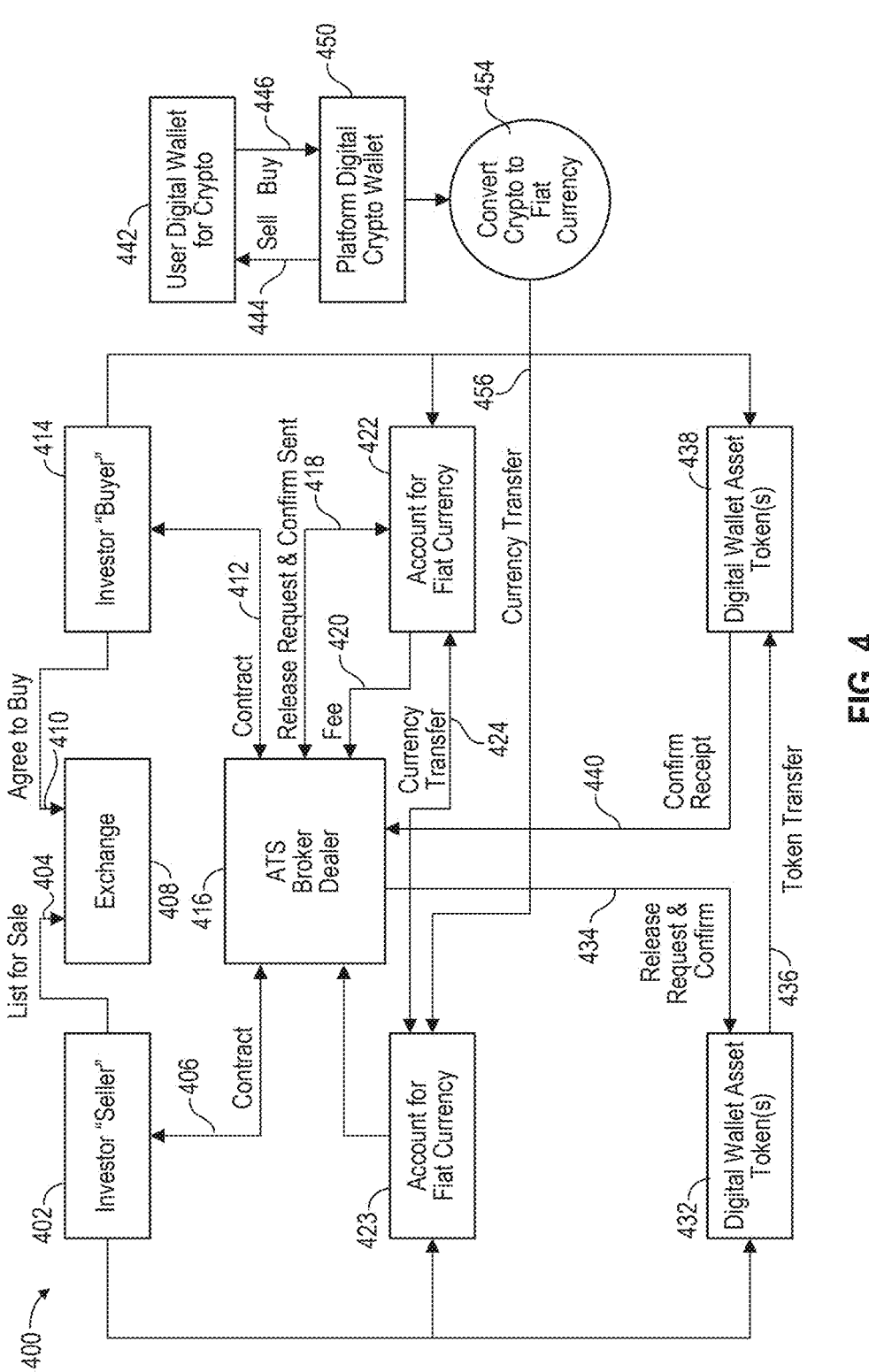
FIG. 4 illustrates an exemplary process for acquiring and transferring asset tokens on the transaction platform of FIG. 1, according to some embodiments of the disclosed technology.

FIG. 4 illustrates an exemplary process 400 for acquiring and transferring asset tokens without intermediate currency conversion through stablecoin, according to some embodiments of the disclosed technology. Process 400 can be implemented using the components of system 100. A first investor (illustrated at block 402), referred to herein as the "seller," such as seller 114, holds an asset token in the seller's asset wallet (e.g., platform digital wallet custody module 152), as depicted at block 432. Seller 114 requests (404) the asset token be listed for sale on an exchange, as illustrated at block 408. In response, the system 100 informs a broker/dealer (at block 416), such as the transaction ATS broker/dealer module 130, which generates a corresponding seller smart contract, and sends that seller smart contract to the seller for acceptance (shown at 406).

A second investor (depicted at block 414), referred to herein as the "buyer," such as buyer 116, agrees (at 410) to acquire the asset token. In response, the platform informs the broker/dealer (at block 416), which generates a corresponding buyer smart contract, and sends (at 412) that buyer smart contract to the buyer (depicted at block 414) for acceptance.

The broker/dealer (at block 416) may perform a verification of funds available in the buyer's accounts, for example, to ensure that the buyer has a sufficient balance to settle the transaction. If not, system 100 may send the buyer a request to add additional currency (e.g., fiat currency, cryptocurrency, tokens, and/or other digital representations of value offered to complete the transaction) to their account(s) being used to fund the acquisition. System 100 may send a release request (at 418) to the buyer's fiat account (block 422), such as the currency custody module 156, to transfer the required amount of fiat currency from the buyer's fiat account (block 422) to the seller's fiat account (block 423), such as the currency custody module 150 via currency transfers (424).

The purchase price amount may be transferred from the buyer's fiat account to the seller's fiat account, minus a service fee (at 420) associated with the acquisition. For example, if there was a purchase of $1000 and a fee of $50, there would be a transfer of $950 from the buyer's fiat account to the seller's fiat account, and a transfer of $50 from the buyer's fiat account to the broker dealer (at block 416). A service fee may be transferred from the buyer's fiat account to the broker/dealer. On receipt of the required amount into the seller's fiat account (at block 423), the platform may inform the broker/dealer.

Various safety actions can ensure an asset token is transferred to an acquiring buyer (and not another user) during the transaction process, an asset token is appropriately delisted as for sale at system 100, and an asset token is free of tampering or interface during the transaction process. For example, at approximately the same time as (or concurrently with) the release request (at 418) sent system 100 to the buyer's fiat account (at block 422), a second release request (at 434) may be sent to the seller's asset token wallet (at block 432) to hold the asset token for the buyer. This combination of release requests may protect the buyer's currency by ensuring the buyer receives the asset token in exchange for the currency transferred to the seller of the asset token, by preventing the seller from interrupting the transfer of the asset token once the seller has accepted the terms to transfer the asset token.

On receipt of the agreed-upon payment, such as, amount of currency (e.g., fiat currency, cryptocurrency, etc.) into the seller's corresponding account, system 100 may transmit a confirmation of receipt to the seller's asset token wallet. In response to receiving the confirmation of receipt of the currency, the seller's asset token wallet (at block 432) may transfer (at 436) the asset token to the buyer's asset token wallet (at block 438), such as platform digital wallet custody module 162. Upon receipt of the asset token, the buyer's asset token wallet (at block 438) may transmit (at 440) confirmation of receipt of the asset token to the broker/dealer (at block 416), thereby completing the transaction. System 100 may update the capitalization table in the primary ledger, such as primary ledger 102 (shown in FIG. 1), to reflect the transaction, and then (possibly automatically) semi-redundantly synchronize the update to the secondary ledger, such as secondary ledger 104 (shown in FIG. 1), accordingly.

Although the acquire/transfer process has been described herein largely in terms of the exchange of fiat currency, either or both of the buyer and seller may use other digital representations of value (e.g., cryptocurrency or other digital tokens) instead of, or in addition to, fiat currency. System 100 may perform any conversions (at 454) between fiat currency, cryptocurrency, and/or other digital tokens as appropriate to facilitate and complete the transactions (444, 446) on system 100.

As described, other aspects include acquiring and transferring asset tokens with intermediate currency conversion through stablecoin. These other aspects include parties to a transaction desiring settlement in different types of currency, such as, for example, one party desiring crypto and another party desiring fiat. In these aspects, ATS broker dealer 416 can include a conversion engine and a coin characteristic module facilitating conversion between crypto and stablecoin and vice versa and between fiat and stablecoin and vice versa. The conversion engine and coin characteristic module may replace conversion 454 reducing potential currency volatility.

Figure 5:
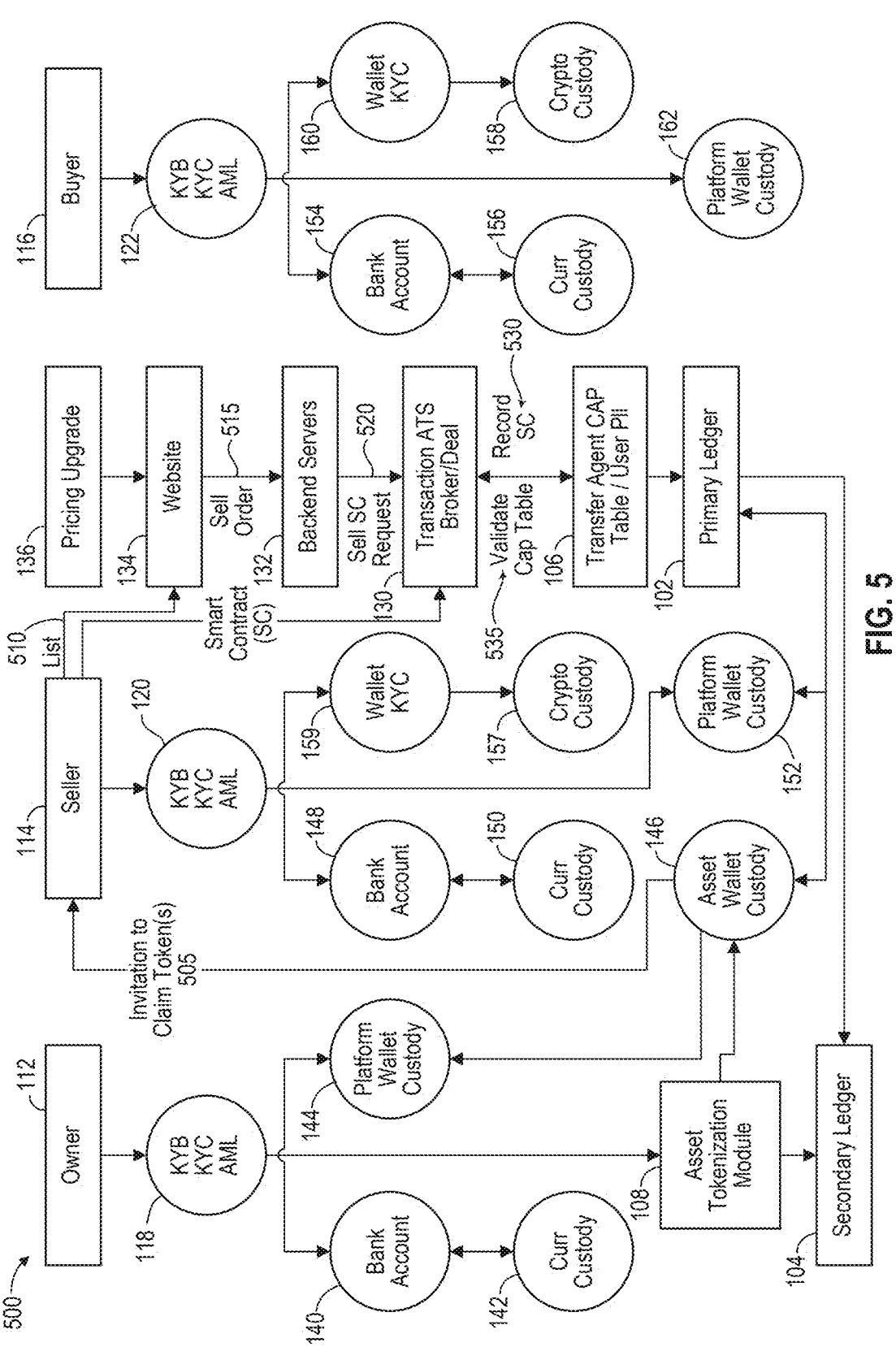
FIG. 5 illustrates an exemplary seller login and transaction flow using the exemplary transaction platform of the system of FIG. 1.

FIG. 5 illustrates an exemplary seller login and transaction flow 500, according to some embodiments of the disclosed technology. Process 500 can be implemented using the components of system 100. Seller 114 may register with and log into system 100 and be authenticated as an authorized user of system 100 according to KYB KYC AML 120 protocols and methodologies. Seller 114 may link bank account 148 and currency custody module 150 to system 100. Currency custody module 150 may serve as a custodian for seller 114's fiat currency on system 100. Platform digital wallet custody module 152 may serve as a custodian for seller 114's digital assets (e.g., tokens representing fractional ownership interests) on system 100.

Crypto custody module 157 may serve as a custodian for seller 114's crypto currency on system 100. Crypto custody module 157 may be configured to hold crypto currency, for example, Bitcoin (BTC), USDC, or other forms of crypto currency including other stablecoin. Crypto custody module 157 may authenticate with system 100 according to wallet KYC 159 protocols and methodologies.

Seller 114 may receive, from asset wallet custody module 146, an invitation 505 to claim digital assets (e.g., tokens) generated by the asset tokenization module 108 to represent investors' shares (fractionalized interest) in an asset tokenized by asset tokenization module 108. An example of such an asset may include real property, e.g., commercial real estate. When seller 114 claims the digital assets (tokens) generated by asset tokenization module 108, asset wallet custody module 146 may transmit the digital assets (tokens) to seller 114's platform digital wallet custody module 152. For example, seller 114 can claim digital assets (tokens) in order to subsequently trade the digital assets at system 100.

Concurrently, also when seller 114 claims the digital assets (tokens) generated by asset tokenization module 108, system 100 can transmit transfer information regarding the transfer (from 146 to 152) to the transfer agent 106. Transfer agent 106 can record the transfer information in primary ledger 102. The transfer information can be (e.g., automatically) semi-redundantly synchronized (e.g., with PII removed) to secondary ledger 104.

Seller 114 may then list 510 the asset and/or asset tokens on system 100 as being available for sale, purchase, exchange, investing in, transferring, or any other appropriate listing action. Seller 114 may list 510 the asset and/or asset tokens via the website 134. For example, website 134 can send user-interface data including listing 510 to a web browser at a computing device. The web browser can present a user-interface including listing 510 at the display device of the computing system. Listing 510 can include a list of multiple assets and/or asset tokens that are available on system 100. The web browser can present a user-interface including listing 510 of the multiple assets and/or asset tokens at the display device.

In one aspect, the user-interface including listing 510 is presented at a web browser of a computing device of buyer 116. In one aspect, listing 510 is presented to buyer 116 with prices indicated in a preferred currency (e.g., selected during account creation). Using an input device at the computing device, buyer 116 can select one or more of multiple assets and/or asset tokens for purchase from the web browser user-interface. Buyer 116's selection can be propagated back to website 134.

Responsive buyer 116's selection from the web-browser user interface, website 134 and/or backend servers 132 can generate a sell order 515. The sell order may be an order to request creation of a smart contract (SC) 525 to facilitate a sale, purchase, exchange, investment in, transferring of, or similar type of disposition of the selected asset(s) and/or asset token(s). In response to receiving the sell order 515, backend servers 132 may generate and transmit a sell SC request 520 to transaction ATS broker/dealer module 130 to request the creation of SC 525 between transaction ATS broker/dealer module 130 and seller 114.

Transaction ATS broker/dealer module 130 may establish SC 525 with seller 114 for the contemplated transaction involving the selected asset(s) and/or asset token(s) transferred to platform digital wallet custody module 152. Transaction ATS broker/dealer module 130 may record the smart contract (operation 530) and update and/or validate the capitalization (cap) table (operation 535) via transfer agent 106. Recording the smart contract and updating and/or validating the capitalization (cap) table can be based on the SC 525 and/or the asset tokens transferred to platform digital wallet custody module 152 by asset wallet custody module 146.

Transfer agent 106 may include and/or utilize user PII of seller 114 and/or owner 112 in the update and/or validation of the cap table. Transfer agent 106 may maintain an up-to-date copy of the cap table and related user PII. Transfer agent 106 may update the cap table and/or related user PII based on input provided via website 134 and routed to transfer agent 106 via backend servers 132 and/or transaction ATS broker/dealer module 130. Transfer agent 106 records the smart contract 525 as well as entries pertaining to the contemplated and performed transactions involving the asset and/or asset tokens in primary ledger 102 and (e.g., semi-redundantly synchronized) in secondary ledger 104.

Figure 6:
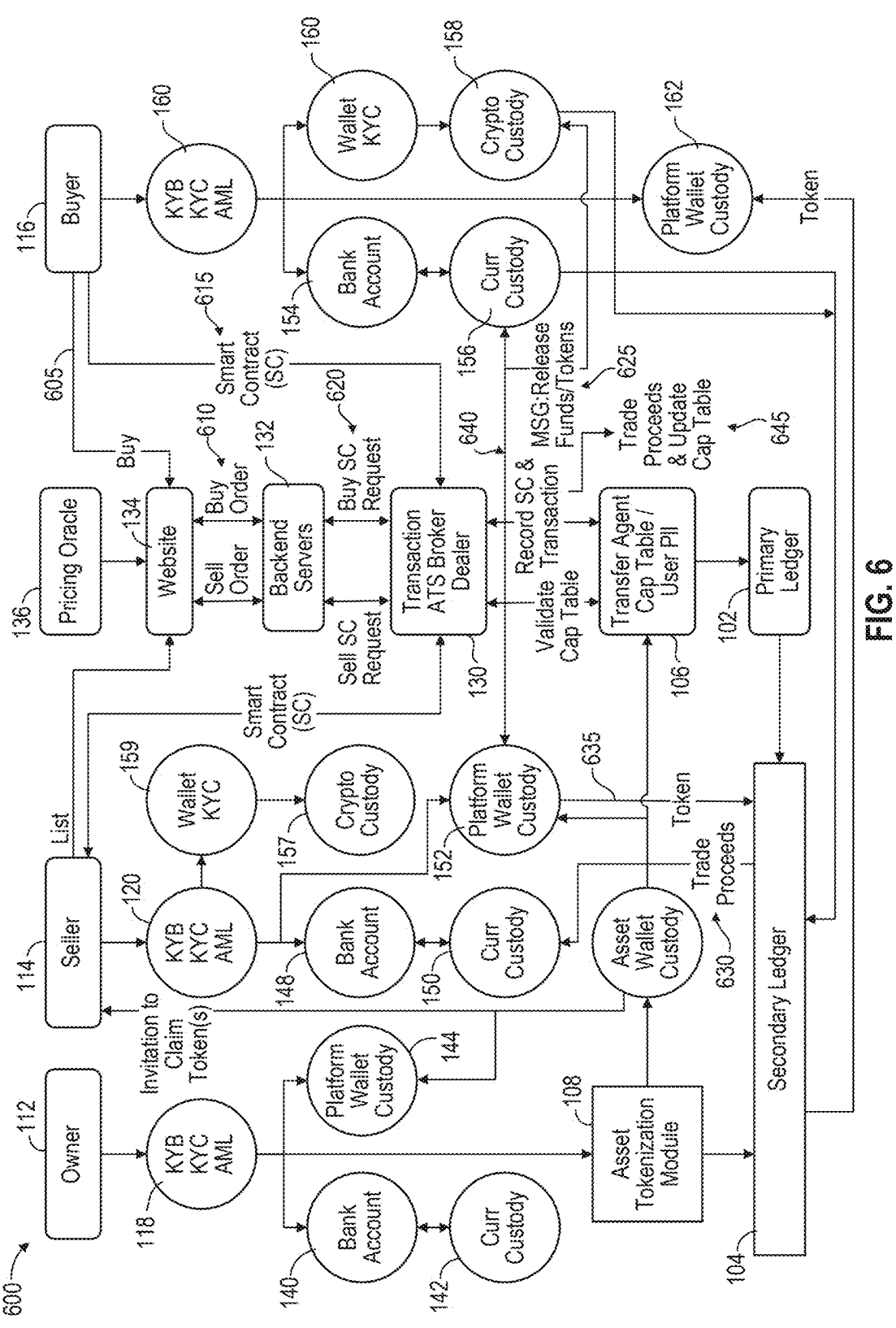
FIG. 6 illustrates an exemplary buyer login and transaction flow 600 using the exemplary transaction platform of the system of FIG. 1.

FIG. 6 illustrates an exemplary buyer login and transaction flow 600, according to some embodiments of the disclosed technology. Process 600 can be implemented using the components of system 100. Buyer 116 may register with and log into system 100 and be authenticated as an authorized user of the system 100 according to KYB KYC AML 122 protocols and methodologies. Buyer 116 may link bank account 154 and currency custody module 156 to system 100. Currency custody module 156 may serve as a custodian for buyer 116's fiat currency on system 100.

Crypto custody module 158 may serve as a custodian for buyer 116's crypto currency on system 100. Crypto custody module 158 may be configured to hold crypto currency, for example, Bitcoin (BTC), USDC, or other forms of crypto currency including other stablecoin. Crypto custody module 157 may authenticate with system 100 according to wallet KYC 160 protocols and methodologies.

Platform digital wallet custody module 162 may serve as a custodian for buyer 116's asset tokens acquired on system 100 by buyer 116.

As described, the user-interface including listing 510 is presented at a web browser of a computing device of buyer 116 and may be presented to with prices indicated in a preferred currency (and that may differ from a preferred currency of seller 114). Using an input device at the computing device, buyer 116 can select one or more of multiple assets and/or asset tokens for purchase from the web browser user-interface. Buyer 116's selection can be propagated back to website 134.

Thus, buyer 116 may view the listed asset and/or asset tokens on system 100 as being available for sale, purchase, exchange, investing in, transferring, or the like via website 134. Responsive to viewing the listing of the asset(s) and/or asset token(s) via website 134, buyer 116 may make an offer to buy 605 the listed asset(s) and/or asset token(s) via website 134. Responsive to buyer 116's offer to buy 605 the listed asset(s) and/or asset token(s), a buy order 610 may be generated by website 134 and/or backend servers 132 (which may host or control at least some aspects of the website 134).

Buy order 610 may be an order to request creation of a create smart contract (SC) 615 to facilitate a sale, purchase, exchange, investment in, transferring of, or similar type of disposition of the asset(s) and/or asset token(s). In response to receiving buy order 610, backend servers 132 may generate and transmit buy SC request 620 the transaction ATS broker/dealer module 130. Buy SC request 620 requests the creation of the SC 615 between transaction ATS broker/dealer module 130 and buyer 116. Transaction ATS broker/dealer module 130 may establish SC 615 with buyer 116 for the contemplated transaction involving the asset(s) and/or asset token(s) transferred to the platform digital wallet custody module 152.

Transaction ATS broker/dealer module 130 may perform on the SC 615 by: (1) transmitting electronic message(s) instructing crypto custody module 158 and/or currency custody module 156 to release buyer 116's purchase funds to be exchanged for seller 114's asset tokens and (2) transmitting electronic message(s) instructing platform digital wallet custody module 152 to release seller 114's asset tokens to be exchanged for buyer 116's funds (operation 625). Responsive to receiving a message from transaction ATS broker/dealer module 130, buyer 116 can release purchase funds (e.g., crypto, fiat, etc.) to Transaction ATS broker/dealer module 130. Concurrently, and also responsive to receiving a message from transaction ATS broker/ dealer module 130, seller 114 can release one or more asset tokens to be purchased to transaction ATS broker/dealer.

Upon receiving (and verifying) the purchase funds and receiving the one or more tokens, transaction ATS broker/ dealer module 130 can check the amount and the currency type used for purchase funds. When the currency type of purchase funds is crypto, ATS broker/dealer module 130 can (through reference to corresponding currency pair) interoperate with a conversion engine (and potentially a coin characteristic module) converting the amount of crypto to an equally valued amount of an appropriate stablecoin. ATS broker/dealer module 130 can convert from crypto to stablecoin in essentially real-time to minimize any adverse financial impact on buyer 116, seller 114, or system 100 due to volatility of the crypto. A similar technique may be used to convert received purchase funds in a less stable stablecoin into another appropriate more stable stablecoin. ATS broker/ dealer module 130 can store the amount of appropriate stablecoin in an internal stablecoin wallet.

Subsequent to receiving purchase funds, and when appropriate, converting purchase funds to appropriate stablecoin, ATS broker/dealer module 130 can transmit electronic message(s) instructing seller 114 to transfer the purchased asset tokens to buyer 112. Responsive to receiving the message(s) from transaction ATS broker/dealer module 130, seller 114's platform digital wallet custody module 152 may transmit the purchased asset token(s) to buyer 116's platform digital wallet custody module 162.

Concurrently with transferring the purchased asset tokens, ATS broker/dealer module 130 facilitates delivery of trade proceeds 630 to seller 114. In one aspect, ATS broker/dealer module 130 transmits electronic message(s) instructing buyer 116 to transfer purchase funds/trade proceeds to seller 114. Responsive to receiving the message, currency custody module 156 and/or crypto custody module 158 may transmit trade proceeds 630 being exchanged for the asset token(s) to currency custody module 150 and/or crypto custody module 157 respectively. Thus, trade proceeds 630 can include crypto and/or fiat.

In one aspect, crypto custody module 158 may include or interface with a module configured to convert crypto into fiat acceptable by currency custody module 150.

Digital wallet custody module 158 can, alternatively or additionally, transmit trade proceeds 630 being exchanged for the asset token(s) that are held in crypto to digital wallet custody module 157. A blockchain may create and store a blockchain entry corresponding to the transfer of trade proceeds 630 from buyer 116's currency custody module 156 and/or digital wallet custody module 158 to seller 114's currency custody module 150 and/or digital wallet custody module 157, respectively.

In other aspects, seller 114's digital wallet custody module 157 can similarly include or interface with a module configured to convert crypto into fiat currency acceptable by buyer 116's currency custody module 156. Responsive to receiving the message from transaction ATS broker/dealer module 130, seller 114's platform digital wallet custody module 152 may transmit asset token(s) 635 to buyer 116's platform digital wallet custody module 162 per the terms of the smart contract 615. The blockchain may create and store a blockchain entry corresponding to the transfer of the asset token(s) 635.

In a further aspect, transaction ATS broker/dealer module 130, having previously received crypto from buyer 116 and converted the crypto to stablecoin, more directly handles transfer of trade proceeds. Transaction ATS broker/dealer module 130 can identify a currency preference for seller 114 from seller 114's account information. ATS broker/dealer module 130 can (through reference to corresponding currency pair) interoperate with the conversion engine converting the amount of stablecoin to an equally valued amount of seller 114's preferred currency, such as, fiat, another crypto, or another stablecoin. ATS broker/dealer module 130 can transfer the amount of the seller 114's preferred currency in essentially real-time to an appropriate custody module (e.g., 150 or 157) minimizing any adverse financial impact on buyer 116, seller 114, or system 100 due to volatility associated with seller 114's preferred currency.

Transaction ATS broker/dealer module 130 may record the smart contract and transaction (operation 640) and update and/or validate the capitalization (cap) table (operation 645) via the transfer agent 106, for example, based on the SC 615, including buyer 116, seller 114, amount of purchase funds, currency type of the purchase funds, amount of trade proceeds, currency type of trade proceeds, digital assets (e.g., tokens) transferred, etc. Transfer agent 106 may include and/or utilize user PII of buyer 116, seller 114, and/or owner 112 in the update and/or validation of the cap table. Transfer agent 106 may maintain an up-to-date copy of the cap table and related user PII. Transfer agent 106 may update the cap table and/or related user PII based on input provided via the website 134 and routed to transfer agent 106 via backend servers 132 and/or transaction ATS broker/ dealer module 130. Transfer agent 106 may also record entries pertaining to the contemplated and performed transactions involving the asset(s) and/or asset tokens, including buyer 116, seller 114, amount of purchase funds, currency type of the purchase funds, amount of trade proceeds, currency type of trade proceeds, digital assets (e.g., tokens) transferred, etc., in the primary ledger 102 and (semi-redundantly synchronized) in secondary ledger 104.

Figure 7:
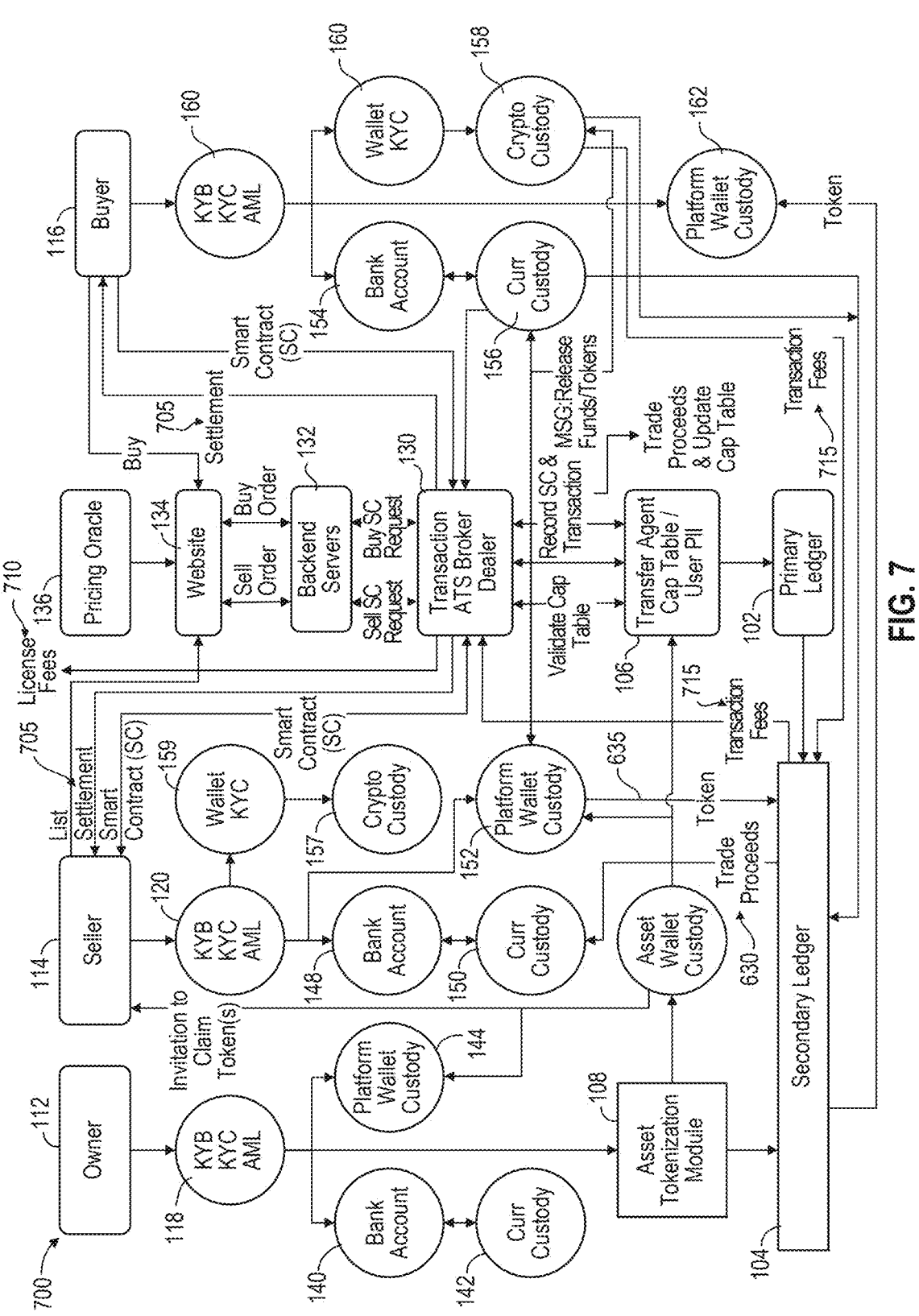
FIG. 7 illustrates an exemplary fee flow using the exemplary transaction platform of the system of FIG. 1.

FIG. 7 illustrates an exemplary fee flow 700, according to some embodiments of the disclosed technology. Process 700 can be implemented using the components of system 100. As the trade proceeds are being transferred on system 100 as described with respect to FIGS. 5-6, transaction ATS broker/ dealer module 130 transmits requests to buyer 116's currency custody module 156 and/or digital wallet custody module 158 and to seller 114's currency custody module 150 and/or digital wallet custody module 157 to collect transaction fees 715 for distribution. Transactions fees 715 can include, but are not limited to, licensing fees 710 distributed to transaction ATS broker/dealer module 130, partnership fees distributed to transfer agent 106, and other appropriate fees.

Transaction ATS broker/dealer module 130 may receive transaction fees 715 associated with the transaction completed (settled) on system 100 from the buyer 116's currency custody module 156 and/or digital wallet custody module 158 and seller 114's currency custody module 150 and/or digital wallet custody module 157. Transaction fees 715 may be payable and funded via fiat currency and/or cryptocurrency, for example, as described above. In some examples, transaction fees 715 may be payable and funded by other digital assets, for example, NFTs.

Moreover, transaction ATS broker/dealer module 130 transmits settlement statements 705 to seller 114 and/or buyer 116. The transfer of transaction fees 715 may be recorded on the primary ledger 102 and (semi-redundantly synchronized) on the secondary ledger 104. As depicted in FIG. 7, transaction fees 715 are payable by and transferred to the transaction ATS broker/dealer 130. However, this is merely an example, and in other examples, transaction fees 715 may be payable by and transferred to transaction ATS broker/dealer module 130 by any combination of owner 112, seller 114, buyer 116, and/or third parties outside system 100, and/or their associated currency custody modules, crypto custody modules, platform wallet custody modules, asset wallet custody modules, and/or the like.

Transaction ATS broker/dealer module 130 may distribute license fees 710 associated with the transaction completed (settled) on system 100 to those owed the license fees 710, such as, transaction ATS broker/dealer module 130. Examples of license fees may include royalties, service fees, intellectual property license fees, and software license fees for software, systems, and methods used by system 100 to complete (settle) the transactions. License fees 710 may be funded from the transaction fees 715 received by transaction ATS broker/dealer module 130.

The described systems, methods, and technologies provide numerous advantages over conventional systems. For example, system 100 may provide owners and sellers with the ability to exit a commercial real estate investment (as an asset) much earlier than the typical hold period for such asset types and with reduce possibility of adverse financial impacts due to currency volatility around the time of a transaction. In many commercial real estate investments, investors may hold the asset for five to seven (5 to 7) years for various reasons associated with processes and procedures for transferring ownership of the asset as a whole. At the end of the hold period (which may be mandated by statute, regulation, or other law, for example, SEC Rule 144), the owner of an investment property (e.g., commercial real estate) may either transfer the property or refinance the property. Refinancing the property may provide a liquidity event to the investor.

A technological system and method for fractionalizing and tokenizing such assets and utilizing stablecoin to mitigate potential currency volatility as described herein may provide owners of assets that would otherwise be subject to extended hold periods the ability to participate in liquidity opportunities and/or offer liquidity opportunities to their investors on a shorter timeline than with conventional legal processes, which may by and large be manually executed with extended delays. The technologies disclosed herein facilitate sellers in trading asset tokens and monetizing their investments in underlying assets, thereby unlocking an ability to re-invest capital and supporting the cycle of investment. For example, liquidity provided by the disclosed technology of system 100, even after just one year, may help create at least five to seven (5-7) times the liquidity in the entire ecosphere compared to traditional approaches. As an example, compared to traditional approaches in which a share of a real estate investment property is held for five (5) years, the technology disclosed herein may facilitate the asset tokens being traded five (5), ten (10), one hundred (100), or more times, for example, within the same five years.

Figure 8:
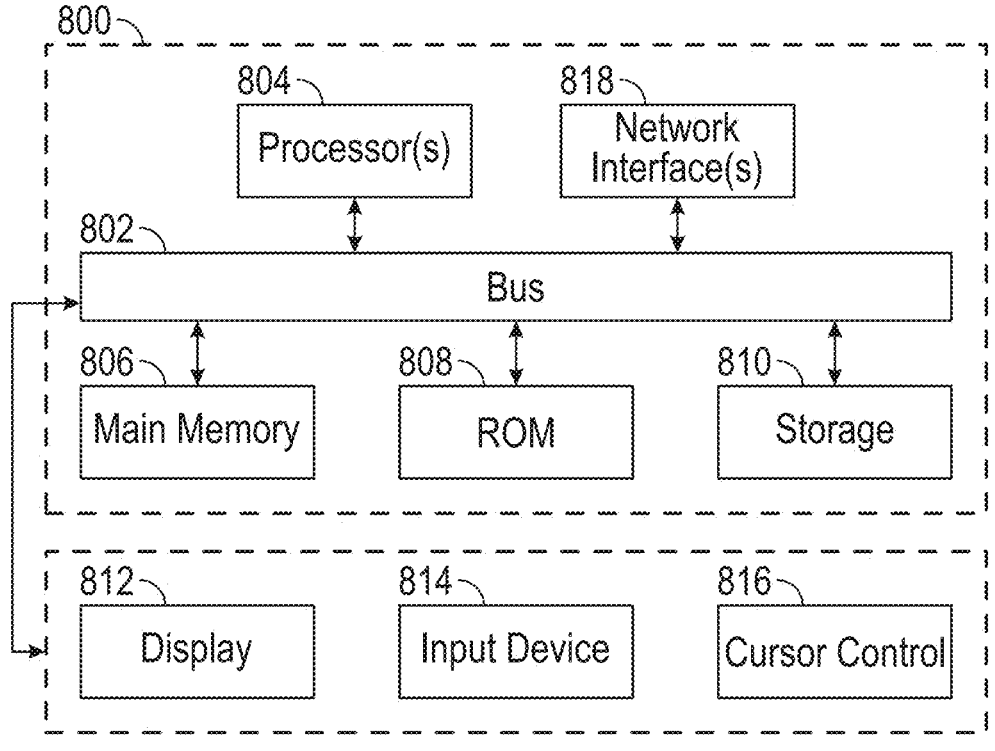
FIG. 8 depicts a block diagram of an example computer system in which embodiments described herein may be implemented.

FIG. 8 depicts a block diagram of an example computer system 800 in which embodiments described herein may be implemented. System 100, computer architecture 1000, computer architecture 1200, computer architecture 1400, etc. can be implemented using components of and computing resources depicted in computer system 800. Computer system 800 may include bus 802 or other electronic communication mechanism for communicating information, and one or more hardware processors 804 coupled with bus 802 for processing information. Hardware processor(s) 804 may include, for example, one or more general purpose microprocessors and/or application specific integrated circuits (ASICs) configured to perform the processes and methods described herein and related processes and methods.

Computer system 800 also may include main (system) memory 806, for example, a random-access memory (RAM), cache, and/or other dynamic storage devices, coupled to bus 802 for storing information and instructions to be executed by processor(s) 804. Main memory 806 can also be used for storing temporary variables or other intermediate information during execution of instructions by processor(s) 804. Such instructions, when stored in storage media accessible to processor(s) 804, may render computer system 800 into a special-purpose machine that is customized to perform the operations specified in the instructions.

Computer system 800 may further include a read only memory (ROM) 808 and/or other static storage device coupled to bus 802 for storing static information and instructions for processor(s) 804. Storage device 810, for example, a magnetic disk, optical disk, and/or USB thumb drive (Flash drive), etc., may be provided and coupled to bus 802 for storing information and instructions.

Computer system 800 may be coupled via bus 802 to display 812, for example, a liquid crystal display (LCD), light emitting diode (LED) display, touch screen, and/or other electronic display for displaying information to a computer user. One or more input device(s) 814, including alphanumeric and/or other keys, may be coupled to bus 802 for communicating information and command selections to processor(s) 804. Another type of user input device may include cursor control 816, for example, a mouse, a trackball, a touchpad, and/or a set of cursor direction keys for communicating direction information and command selections to processor(s) 804 and for controlling cursor movement on display 812. In some examples, direction information and command selections (e.g., selecting assets and/or tokens from a listing) may be provided by cursor control may also or alternatively be implemented via receiving touches on a touch screen without the use of a separate cursor control device.

Computing system 800 may include a user interface module to implement a graphical user interface (GUI) that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the words "component," "engine," "system," "database," "data store," and the like, as used herein, may refer to logic embodied in hardware or firmware, or to a collection of software instructions, possibly having entry and exit points, written in a programming language, such as, for example, Java, C, or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, and/or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 800 may implement the techniques described herein using customized hard-wired logic, one or more ASICs or FPGAs, firmware and/or program logic which in combination with computer system 800 causes or programs computer system 800 to be a special-purpose machine. According to one embodiment, the techniques herein are performed by computer system 800 in response to processor(s) 804 executing one or more sequences of one or more instructions contained in main (system) memory 806. Such instructions may be read into main (system) memory 806 from another storage medium, such as storage device 810. Execution of the sequences of instructions contained in main (system) memory 806 may cause the processor(s) 804 to perform the methods and/or operations described herein. In alternative embodiments, hard-wired circuitry may be used in place of or in combination with software instructions.

The term "non-transitory media," and similar terms, as used herein refers to any non-transitory media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main (system) memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media may also take the form of acoustic or light waves, such as those generated during radio-wave and infra-red data communications.

Computer system 800 may also include one or more communication network interface(s) 818 coupled to bus 802. Network interface(s) 818 may provide two-way data communication coupling to one or more network links that are connected to one or more local networks. For example, network interface(s) 818 may include an integrated services digital network (ISDN) card, cable modem, satellite modem, or a modem to provide a data communication connection to a corresponding type of telephone line. As another example, network interface(s) 818 may include a local area network (LAN) card to provide a data communication connection to a compatible LAN (and/or a wide area network (WAN) component to communicate with a WAN). Wireless links may also be implemented. In any such implementation, network interface(s) 818 send and receive electrical, electromagnetic, and/or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP in turn may provide data communication services through the worldwide packet data communication network now commonly referred to as the "Internet." Local network and Internet both use electrical, electromagnetic, electronic, and/or optical signals that carry digital data streams. The signals through the various networks and the signals on network link and through network interface(s) 818, which may carry the digital data to and from computer system 800, are example forms of transmission media.

Computer system 800 may send and receive electronic messages and data, including program code, through the network(s), network link and network interface(s) 818. In the Internet example, a server might transmit a requested code for an application program through the Internet, the ISP, the local network, and network interface(s) 818.

The received code may be executed by the processor(s) 804 as it is received, and/or stored in the storage 810, or other non-volatile storage for later execution.

Dual Syncing Ledger

Figure 9A:
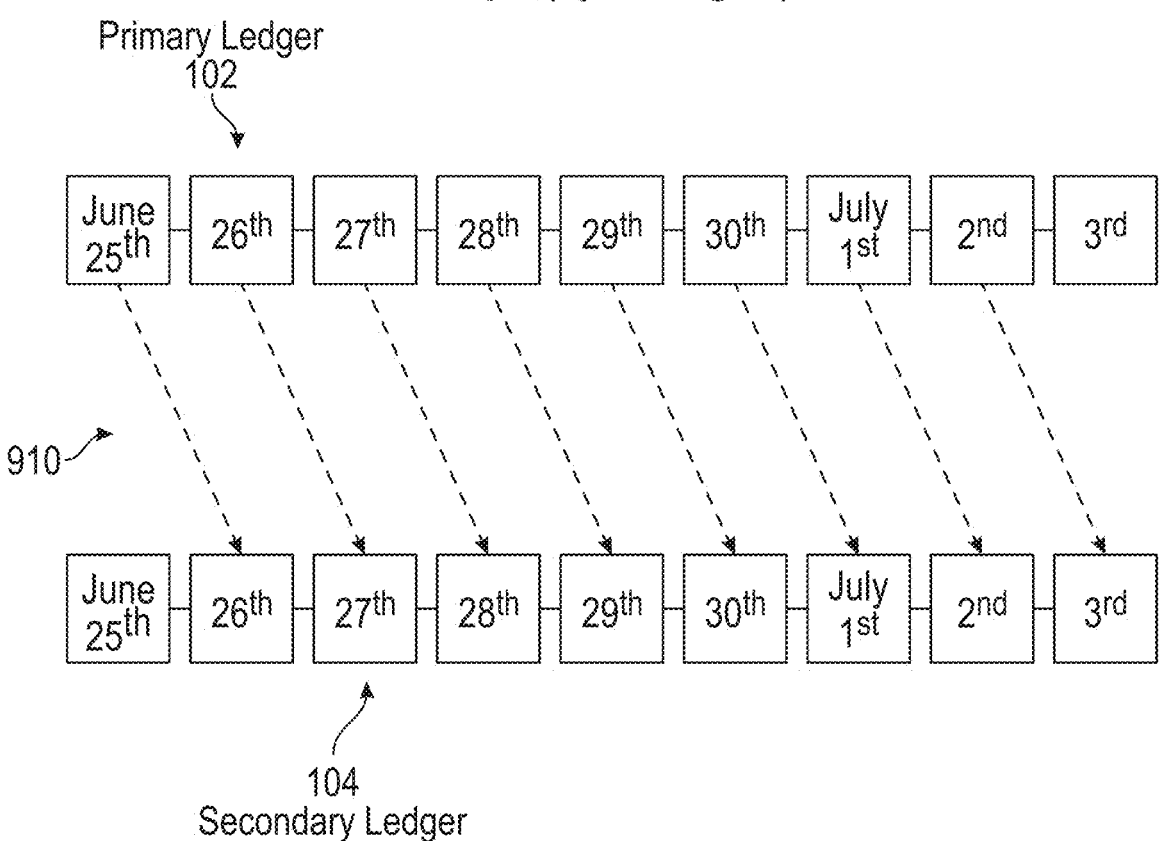
FIGS. 9A, 9B, and 9C collectively illustrate an exemplary ledger syncing flow using the exemplary transaction platform of the systems of FIGS. 1 and 5-7.
Figure 9B:
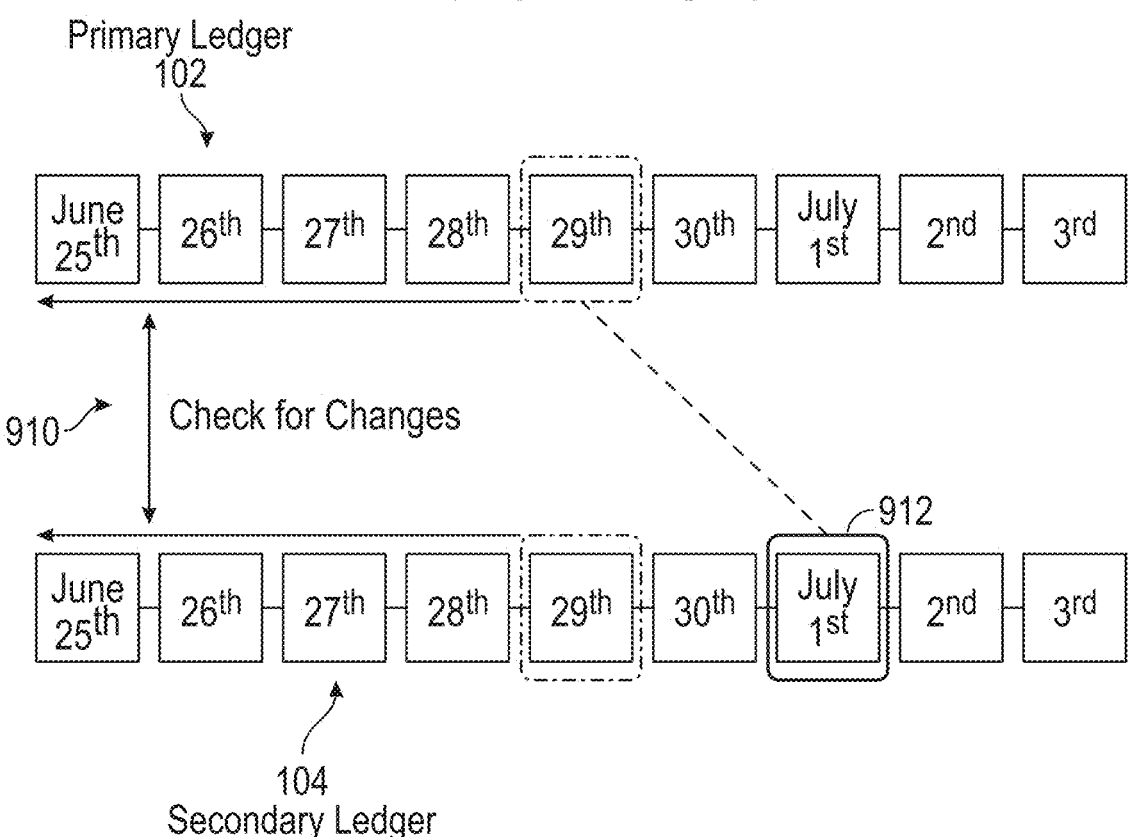
Figure 9C:
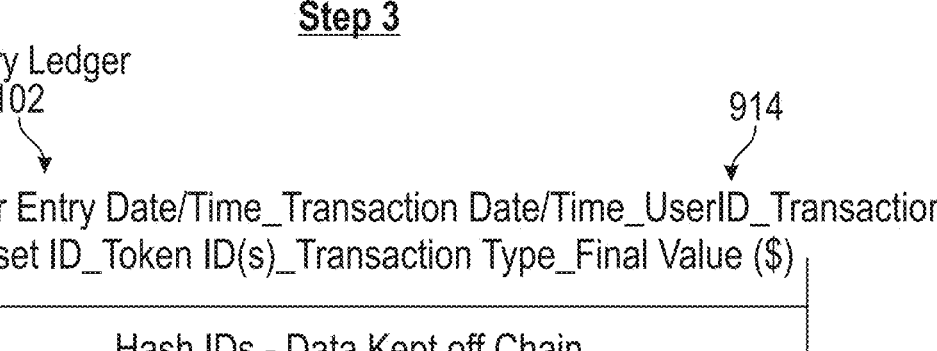
Figure 9C:
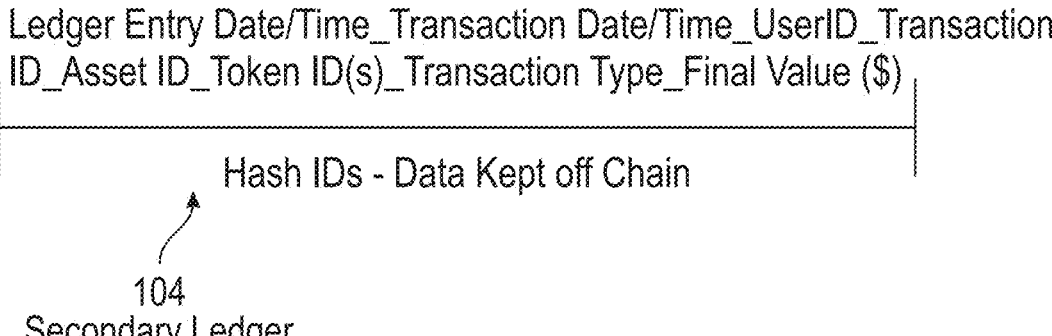

FIGS. 9A-9C are block diagrams illustrating an exemplary process of syncing a traditional (e.g., web2) primary ledger (e.g., database) with a secondary blockchain (e.g., web3) ledger (e.g., blockchain), according to example embodiments of the disclosed technology. The syncing module 910 will detect and correct any deltas between the two ledgers. This syncing module 910 is radically different from what exists today because it has devised a way to bridge data across web2 and web3.

It is understood that web2 databases can be altered from their original state, either intentionally or inadvertently (for example, via human error or fraud). It is also understood that the blockchain is an immutable record of data and transactions. The convergence of the two via this syncing module 910 is needed before old web2 technology systems can transition into the new world of web3 technology. This syncing module 910 will be applicable throughout the sunset of web2 into the sunrise of web3.

The original use case for the syncing module 910 is, for example, within a regulated financial Exchange.

As part of the trading flow in the Exchange, a primary database ledger, such as the primary ledger 102, keeps a record of ownership in the real estate assets that are listed and trading on the Exchange. The ultimate ownership record consists of an original Capitalization Table; the database e.g., the primary ledger 102) stores the original and then updates it when changes occur. Within the Exchange ecosystem, ownership in real estate assets is represented by digital assets including, but not limited to, nonfungible tokens (NFTs), fungible tokens, hybrid tokens, cryptocurrencies, crypto tokens, crypto coins, security token, and asset tokens, having metadata including identification information of the buyer of the NFTs, that trade on the Exchange. When the tokens transact between buyers (such as buyer 116) and sellers (such as seller 114), these transactions are captured on the primary ledger (and are reflected as changes to the original Capitalization Table), such as the primary ledger 102.

All of the activity on the primary ledger 102 is then written to the blockchain as a secondary ledger, such as the secondary ledger 104. There is a slight time delay between the primary entry on the primary ledger 102 and the secondary entry on the secondary ledger 104 to ensure the primary entry is complete and correct. This means that the same original Capitalization Table, as well as subsequent transactions and changes in ownership, currency usage, transaction parties, and another other transaction data etc. are recorded on the blockchain (e.g., the secondary leger 104) after they are recorded to the primary ledger 102. The syncing module 910 ensures that the two ledgers (such as the primary ledger 102 and the secondary ledger 104) always match. When they do not match, that means that a mutation has occurred on the primary ledger 102. The syncing module 910 flags an investigation into why the primary ledger 102 has changed. In the case of fraud or human error, the primary ledger 102 can be corrected. In the event the original primary entry was incorrect and the updated entry fixes a problem, the blockchain (such as the secondary ledger 104) will be updated to reflect the correct entry (and the two ledgers, the primary ledger 102 and the secondary ledger 104, will again be in sync).

The broader use case beyond the financial Exchange is with any kind of industry or company where a business is currently saving data into any structured web2 database (an example would be SQL or NoSQL). As the majority of businesses today write to a database for some reason, this syncing module 910 will ultimately be ubiquitous.

The standard practice for a basic database is to write many times, and read many times. A key issue with this model is that a company or entity's database is not visible to the public, and cannot be audited (except via express invitation). This necessarily reduces transparency in whatever system is in question (law enforcement, public financial markets, etc.) because the public has no access to original information—and cannot independently verify any activity or changes to that information (either before or after any public disclosure). However, implementation with the blockchain (e.g., the secondary ledger 104) provides a solution. The secondary ledger 104 is immutable (write once, read many). It is also public and can be viewed by anyone. Using this novel syncing module 910, a company or entity can still maintain their own database (e.g., the primary ledger 102), and can also have some transparency and accountability within public society, systems, and markets.

Increasing transparency does not mean reducing privacy. The syncing module is configured to hide the identifiers that make a person or entity "who" they are (e.g., hide identifiers associated with a person or entity). What is shown on the blockchain (e.g., the secondary ledger 104), to the public, is the transaction data itself. This syncing module allows the public arena to audit a private database system (e.g., the primary ledger 102) without necessarily knowing who the private information belongs to (beyond knowing that the transaction or entry occurred, and therefore it belongs to someone). In fact, the disclosed technology makes it less likely to have privacy data leaks out of institutional databases (via manual error or criminal activity), and thus will preserve privacy. The syncing module 910 creates a bridge to help transition into a world of increased transparency, improved fraud and consumer protection, increased data accuracy, and improved privacy.

This technology should be instantly helpful to all companies that have some component of needing public trust. For example, when a publicly-traded company hires an accounting firm to do an audit for their 10K—details are not public and there is often no way to corroborate that the audit is correct besides accepting the auditor's work. With implementation of the syncing module, information in the databases (e.g., the primary ledger 102)—as well as even initial work by auditors—would be on the blockchain (e.g., the secondary ledger 104) for anyone to see and verify. In the initial use case of a financial Exchange, the public will be able to see transaction records clearly on the blockchain (e.g., the secondary ledger 104). Although private entity details will be hidden on the secondary ledger 104, inherently the Exchange will be fully auditable by the public. This is a key way for any Enterprise to prove integrity to the world in a way that has never been done before. As such, the syncing module 910 provides an improvement over existing computing functionality by allowing computing performance of a function not previously performed before.

The disclosed technology will also have a positive impact on the efficiency and profitability of any entities that require some sort of audit in their business. Users will range from private entities, to public companies, to non-profit organizations, to different arms of the government (ranging from law enforcement agencies to legislatures), and beyond. Auditing of information will no longer take months, it will take seconds. This will reduce labor costs, and direct efforts towards more productive areas of the business/agency/user than the auditing function. Discrepancies will be quickly logged and remedied, meaning that costly errors will be resolved much more quickly as well.

The syncing module 910 first interacts with a primary database ("DB"), such as the primary ledger 102, of an entity. The DB is private, for example, such as the primary ledger in the initial use case of the Exchange. Entries are written to the DB according to the business practice of the entity.

The syncing module 910 will next record the private DB entries on a public blockchain (e.g., the secondary ledger 104), after removing or anonymizing any PII or otherwise required or nonpublic data. Note that there is an option to remove the PII (or not). If PII is stripped, the entry will be turned into a hashID via the syncing module 910, in some aspects. The hashID is stored somewhere (off chain such as IPFS, or another database). The PII may be replaced by a hash in the blockchain (e.g., the secondary ledger 104).

After this anonymization (by choice) process, the entry is recorded in the blockchain (e.g., the secondary ledger 104). Recording an entry in the blockchain (e.g., the secondary ledger 104) will lag its entry into the private DB (e.g., the primary ledger 102), for example by 24 hours or any other appropriate time interval (e.g., in seconds, minutes, hours, or some combination thereof). The lag is intentional, to give time to correct errors in the original DB (e.g., the primary ledger 102) before recording those entries as final on the blockchain (e.g., the secondary ledger 104).

There are several options for the user regarding the length of the lag. The user could select a lag that is arbitrary, meaning that the organization or individual can choose any length of time they want. It is noted that the longer the time frame becomes (between the original entry and the writing to the blockchain (e.g., the secondary leger 104)), the more risk is introduced that original data integrity has not been preserved. It is also noted that if the lag is too short after the initial ledger entry, this introduces risk that 1) the blockchain (e.g., the secondary ledger 104) will have to be updated, or 2) that multiple data entries would have to be input into the primary ledger 102 and the secondary ledger 104 (to correct initial benign issues in the primary ledger 102 that are the result of human error and are corrected soon thereafter). The user could select a lag that is a stated non-arbitrary time frame based on business practices. Some transactions take longer to settle than others, or some datasets take a defined time period to complete from start to finish, and therefore a longer time frame might make sense to sync the databases (e.g., the primary ledger 102 and the secondary ledger 104). Finally, the user could select a randomizer that writes the database at different times to help prevent the predictability of the process. Once written to the blockchain (e.g., the secondary ledger 104), the entry is immutable.

Subsequent modifications to the DB entry must be reflected in the blockchain (e.g., the secondary ledger 104). Any intentional changes to a DB entry (after it is initially recorded on the blockchain (e.g., the secondary ledger 104)) can be made by recording an additional, corrected entry in the blockchain (e.g., the secondary ledger 104). The key point here is that any changes will be transparent to the world.

After the entry is recorded in both the DB (e.g., the primary ledger 102) and the blockchain (e.g., the secondary ledger 104), the syncing module 910 will come in and perform an audit at random. The randomization of the timing of the audit means that an entity looking to manipulate the syncing technology cannot predict when and "where" (on the blockchain (e.g., the secondary ledger 104)) it will perform its checks (this is a deterrent).

The syncing module 910 manages the randomization process by an algorithm built for this purpose. The syncing module 910 randomly selects dates and times from a calendar list. The selection process entrants are from 1) the beginning of time of the entity (the first entry is the earliest the audit can "look back" to), through 2) up until the last (most recent) entry. The date entrants are identified by numbers (e.g. Dec. 1, 2021 is "25"). Every single date and time in between that range is within the randomizer. The randomizer selects a group of numbers (like a lottery). The chosen numbers correlate to the date and time for which the syncing is checked. For example, if the randomizer pulls 25, Dec. 1, 2021 is checked. The audit process of the syncing module 910 will then look to see what transactions were recorded on the date and time that the randomizer selected. If there were no transactions on that date, then the randomizer would not perform an audit (this would be highly unlikely, but that would be the outcome). If there are transaction(s) on the date selected, the syncing module 910 will look up all transactions on that day, and selects a number (from one transaction to infinite transactions) in order to determine how many transactions it will audit on that date and time. For example, if "4" is chosen, the randomizer then goes in and selects at random any 4 transactions on Dec. 1, 2021 and performs the audit.

The audit will use a time lag to confirm the integrity of the primary DB (e.g., the primary ledger 102). The syncing module 910 will look back in time at a random date on the primary ledger 102, and compare the data for that date (and back) to the blockchain (e.g., the secondary ledger 104). The syncing module 910 confirms that nothing has been changed by comparing the data for that date (or the data for a block of dates) to the blockchain (e.g., the secondary ledger 104). In the initial use case of the Exchange, the audit might confirm that the income statement and balance sheet remain consistent on a given day, or that randomly-selected transactions (for example, 100 different transactions within a given date range) remain consistent An example of how this audit works: On July 1, the blockchain (e.g., the secondary ledger 104) can go to a random date (e.g. June 29th) and look at the data on the primary ledger (e.g., the primary ledger 102) for that date (or a bulk of dates, e.g. June 25-June 29). Assuming a standard 24-hour lag in the syncing process of the syncing module 910, the entry to the secondary ledger 104 would have been written on the 30th. The syncing module 910 will compare the block of data from June 25-June 29th on both the primary ledger 102 and the secondary ledger 104, and confirms it still matches. The audit can be performed at multiple different times. Ranges are selectively entered and could be from every second to once a day or longer, depending on the use case (this is user defined).

If syncing module 910 determines that there is a mismatch between the primary ledger 102 and the secondary ledger 104, the auditor will alert the user. There are several ways this can happen: (1) alert within the system—system alerts, (2) outside the system—emails or SMS, or (3) due to the public nature of the secondary ledger 104 on the blockchain, the public is also performing a constant audit simultaneously. Public users can alert the user. Whatever the user does to remedy the mismatch will be written to the blockchain (e.g., the secondary ledger 104) and that too will be publicly seen.

The outcome of the audits are public. If there have not been any changes and the primary ledger 102 and the secondary ledger 104 match during the audit, the audit is recorded on the blockchain (e.g., the secondary ledger 104) as passing. This increases the transparency score of the entity (either explicitly via user KPIs, or implicitly via public perception). If changes are detected via the syncing module 910, after the system is alerted and corrections are made to the primary ledger 102, this change is also published on the blockchain (e.g., the secondary ledger 104). This incentives timely response and accurate correction by the user.

The syncing module 910 is configured to use transaction IDs to indicate whether the new entry on the blockchain (e.g., the secondary ledger 104) is an original entry, or is a correction that refers to a prior block on the chain. Any update will have a transaction ID, which reflects either an initial transaction or a correction based on an audit. The entry will flag that this is a unique and new transaction, or it will reflect the date and time the original entry was made to the blockchain (e.g., secondary ledger 104). Any correction will show that this is not an initial transaction, but a corrected action based on the audit (the entry will point to the original transaction ID on the blockchain (e.g., the secondary ledger 104) and the primary ledger 102—they will always be linked). A user can query on the blockchain (e.g., the secondary ledger 104) using the transaction ID to see how many (if any) updates were made (beyond the original entry). There could be multiple corrections made to the blockchain (e.g., the secondary ledger 104) over time, of which the transaction ID and the date of every blockchain entry will be listed. In theory there could be one to infinity audit entries that will always be linked to one another.

FIGS. 9A, 9B, and 9C collectively illustrate an exemplary syncing flow using the exemplary transaction platform of the systems of FIGS. 1 and 5-7. With particular reference to FIG. 9A, Step One shows a sample sync, via the syncing module 910, between the primary ledger 102 (with illustrative "days" representing data written over a daily period), and then shows a time delay to sync to the secondary ledger 104 (blockchain).

Referring to FIG. 9B, Step Two shows a sample audit process of the syncing module 910 where the syncing module 910 takes a sample data set 912 on the blockchain (e.g., the secondary ledger 104), and "looks back" to compare the data between the primary ledger 102 and the secondary ledger 106. If the syncing module 910 does not find any changes, the audit is recorded on the secondary ledger 106 as PASSING. If the syncing module 910 does detect changes, on the other hand, the syncing module 910 can facilitate transmission of alerts via text (SMS), email, and other appropriate alerts, and the changes are also publicly available for viewing on the secondary ledger 104.

Referring to FIG. 9C, Step Three shows a sample data structure 914 for the entries in the primary ledger 102 and the secondary ledger 104. The pointers are the names of the data in the structure. In certain aspects, the primary pointers in the syncing module 910 are, for example, transaction date, transaction time, the date the entry was written to the ledger, the time the entry was written to the ledger, and user ID (pointing between the primary ledger 102 and the secondary ledger 104). All the fields need to match for the check to be complete.

The syncing module 910 is able to combine a check of the transaction date and time (down to the millisecond) and join that with the transaction ID (as it is a unique identifier). Those two in tandem are the primary ways to look up and point between the dual ledgers (e.g., the primary ledger 102 and the secondary ledger 104), and joining these points together is the primary way the syncing module 910 checks to determine whether there has not been any manipulation in the primary ledger 102.

Determining Stablecoin Stability

As described, "stablecoin" is a type of crypto currency where the value of units (e.g., coins) is pegged to a reference asset, such as, for example, fiat currency, exchange-traded commodities (e.g., precious metals or industrial metals), other crypto currency, crypto currency portfolios, another stablecoin, etc. Thus, based at least in part on a reference asset, different stablecoin types can have different volatilities. Other factors, such as public coin data, private coin data, economic data, currency data, etc. can also alter the volatility of a stablecoin type.

Figure 10:
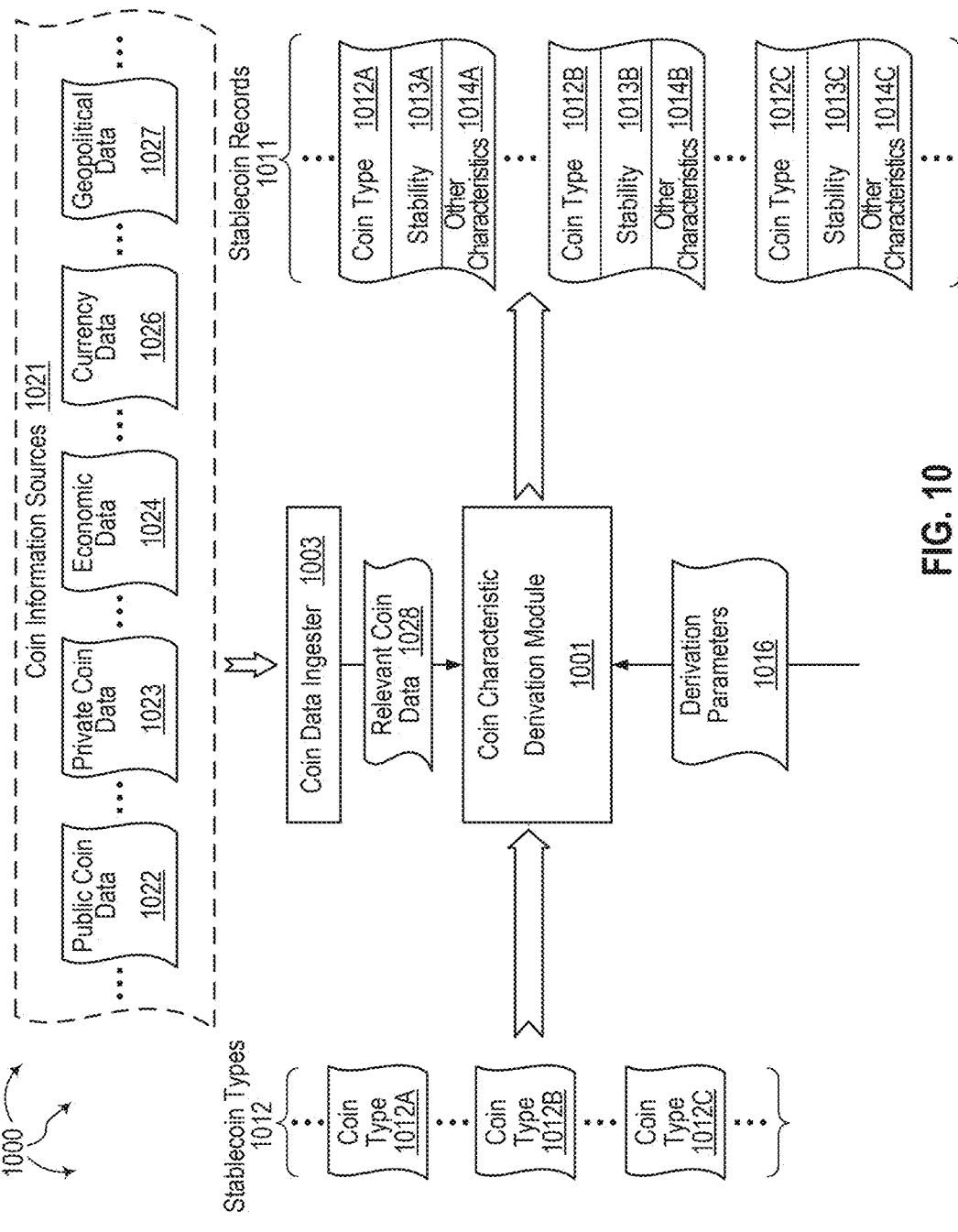
FIG. 10 illustrates an example computer architecture that facilitates determining stablecoin stability.

FIG. 10 illustrates an example computer architecture 1000 that facilitates determining stablecoin stability. The components of FIG. 10 can include, be implemented within and/or can interoperate with any of the components of system 100 and/or of computer system 800.

As depicted computer architecture 1000 includes coin characteristic derivation module 1001 and coin data ingestor 1003. Generally, coin characteristic derivation module 1001 is configured to formulate stablecoin records for a plurality of stablecoin types. Each stablecoin record can indicate a stability characteristics and other characteristics of a corresponding stablecoin type. In aspects, coin characteristic derivation module 1001 formulates stablecoin records based on relevant coin data and in accordance with derivation parameters.

Coin data ingestor 1003 is configured to ingest coin information from a variety of coin information sources, filter the ingested coin information into relevant coin data, and send relevant coin data to coin characteristic derivation module 1001. Coin characteristic derivation module 1001 can receive relevant coin data from coin data ingestor 1003.

In general, derivation parameters 1416 define when and how stablecoin characteristics are to be derived. In one aspect, derivation parameters define how often coin data is to be ingested and stablecoin characteristics to be derived. For example, derivation parameters can define ingesting coin data and/or deriving stablecoin characteristics on a constant, ongoing basis, on demand when requested, in response to specified events, at designated times or intervals, at specified frequencies (e.g., every minute, every second, every 10 ms, etc.). Derivation parameters 1416 may define different coin data ingestion and stablecoin characteristic derivation for different stablecoins.

Figure 11:
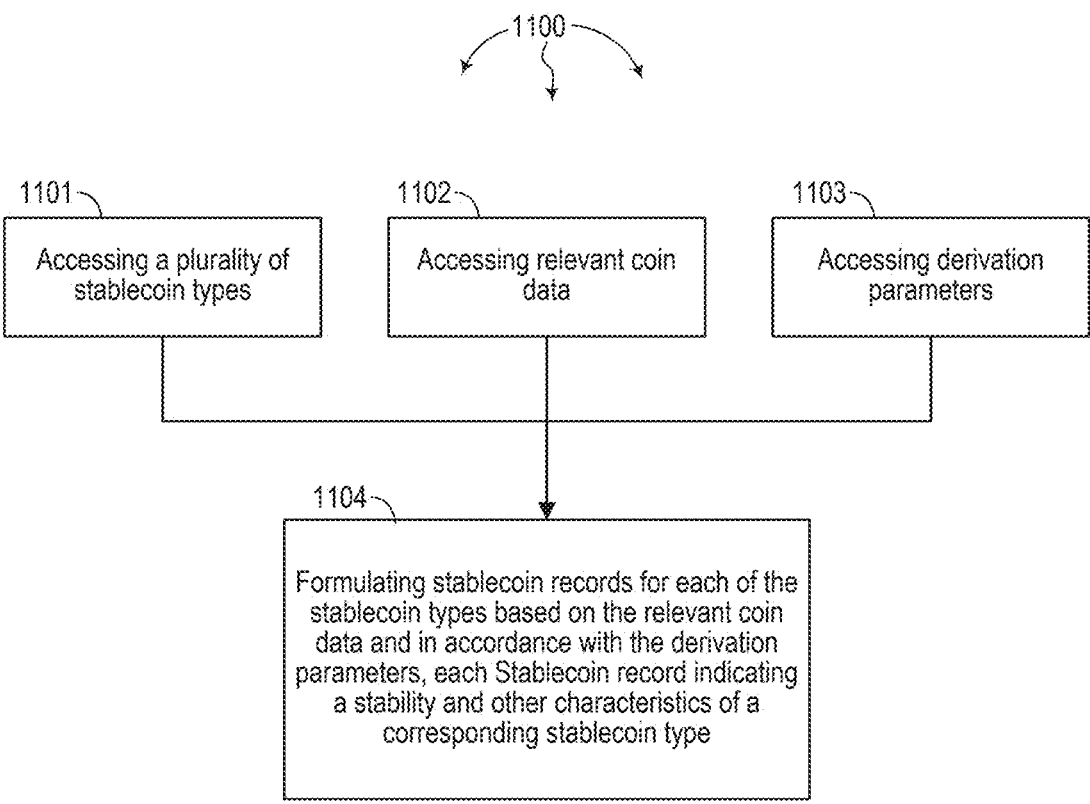
FIG. 11 illustrates a flow chart of an example method for determining stablecoin stability.

FIG. 11 illustrates a flow chart of an example method 1100 for determining stablecoin stability. Method 1100 will be described with respect to the components and data in computer architecture 1000. As such, method 1100 is suitable for use with the exemplary transaction platform of the systems in FIGS. 1-7.

Method 1100 includes accessing a plurality of stablecoin types (1101). For example, coin characteristic derivation module 1001 can access stablecoin types 1012, including coin type 1012A, coin type 1012B, coin type 1012C, etc. Method 1100 includes accessing relevant coin data (1102). For example, coin characteristic derivation module 1001 can access relevant coin data 1028 from coin data ingestor 1003. Coin data ingestor 1003 can ingest coin data from coin information sources 1021, including public coin data 1022, private coin data 1023, economic data 1027, currency data 1026, geo political data 1027, etc. Coin data ingestor 1003 can filter the ingested coin data into relevant coin data 1028 and send relevant coin data 1028 to coin characteristic derivation module 1001.

Method 1100 includes accessing derivation parameters (1103). For example, coin characteristic derivation module 1001 can access derivation parameters 1416. Derivation parameters 1416 can define, for example, on a per coin type basis, when and how stablecoin records are to be formulated. In one aspect, derivation parameters 1416 define how stable coin stabilities are to be derived (e.g., formulas). The coin stability formulas can be applied to relevant coin data for a coin type to derive a corresponding coin stability for the coin type, for example, over defined historical periods, predicted for future time periods, etc. As described, derivation parameters 1416 can define that stablecoin records are to be formulated at specified times, on regular intervals, at particular frequencies, in response to specified events, etc. A specified event may include when a coin type is being considered for use at system 100, when resource usage at system 100 (e.g., computing, system memory, storage, network, etc.) is below specified thresholds, etc.

Derivation parameters 1416 can also define how other characteristics for a coin type are to be derived. Other characteristics can include coin usage restrictions, reference asset category, algorithmic/non-algorithmic, transparency, etc. Some coin types may be restricted in some jurisdictions, restricted for some types of transactions, restricted for transactions for specified assets, etc. Also, a stablecoin with increased stability may be associated with reduced transparency into the stablecoin's valuation. The reduced transparency can decrease the likelihood of system 100 using the stablecoin.

Method 1100 includes formulating stablecoin records for each of the stablecoin types based on the relevant coin data and in accordance with the derivation parameters, each stable coin record indicating a stability and other characteristics of a corresponding stablecoin type (1104). For example, coin characteristic derivation module can formulate stablecoin records 1011, including stablecoin record 1011A, stablecoin record 1011B, stablecoin record 1011C, etc. As depicted, stablecoin record 1011A is for coin type 1012A and indicates stability 1013A and other characteristics 1014A. Similarly, stablecoin record 1011B is for coin type 1012B and indicates stability 1013B and other characteristics 1014B. Similarly, stablecoin record 1011C is for coin type 1012C and indicates stability 1013C and other characteristics 1014C.

A currency conversion engine can consider stablecoin records 1011 when selecting a stablecoin, from among stablecoin types 1012, for use in intermediate currency conversions (and to mitigate potential adverse financial impacts of currency, and more specifically crypto, volatility) when performing/settling a transaction.

Currency Conversions Associated with Digital Asset Transactions

Figure 12:
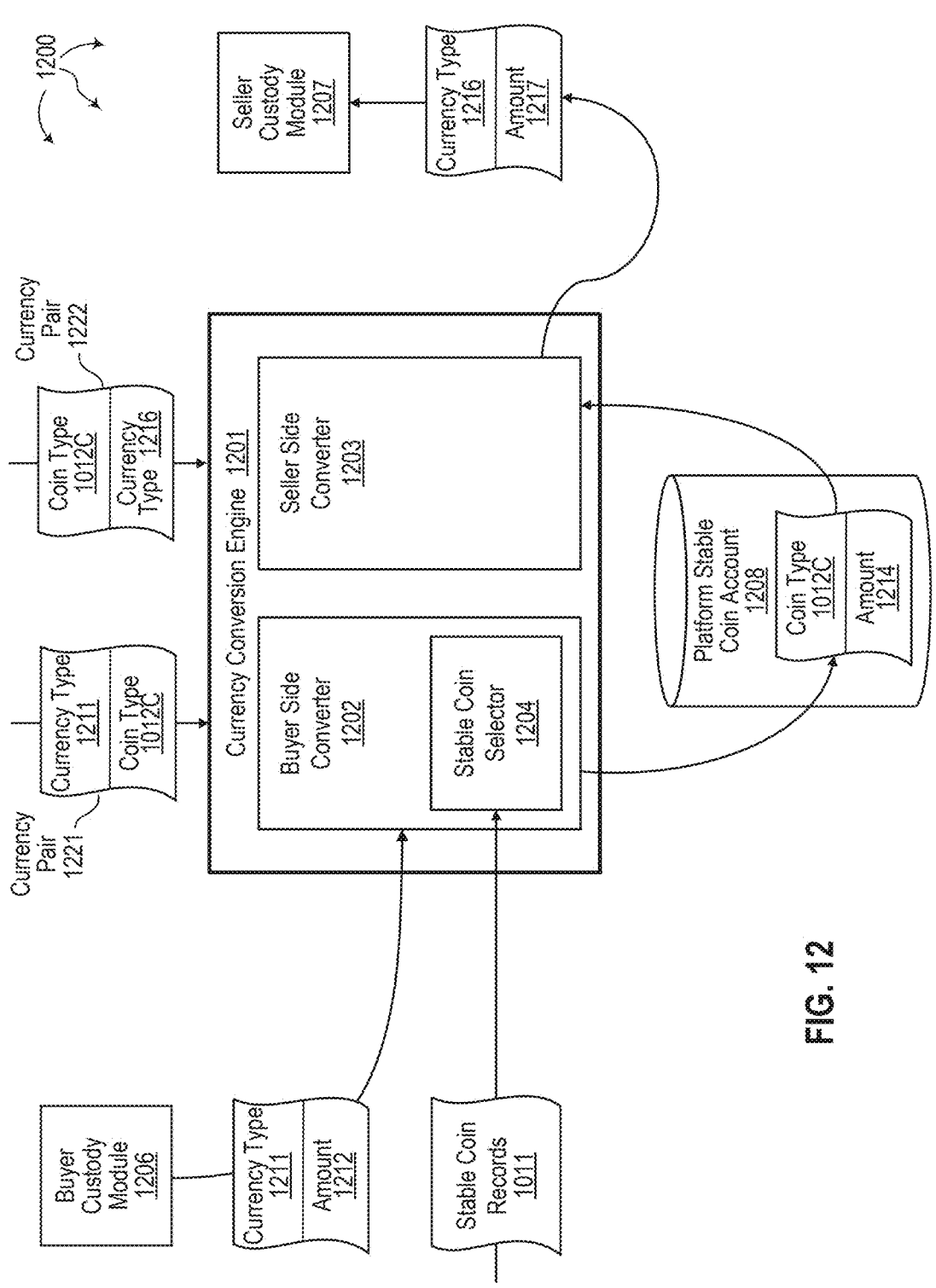
FIG. 12 illustrates an example computer architecture that facilitates handling currency conversions associated with digital asset transactions.

As described, a currency conversion engine can be utilized to mitigate potential adverse financial impacts to parties participating in a transaction from currency volatility. FIG. 12 illustrates an example computer architecture 1200 that facilitates handling currency conversions associated with digital asset transactions. The components of FIG. 12 can include, be implemented within and/or can interoperate with any of the components of system 100 and/or of computer system 800.

As depicted, computer architecture 1200 includes currency conversion engine 1201, buyer custody module 1206, seller custody module 1207, and platform stablecoin account 1208. Currency conversion module further includes buyer side converter 1202 and seller side converter 1203. Buyer side converter 1202 further includes stablecoin selector 1204.

In general, currency conversion engine 1202 is configured to receive an amount of a currency type (e.g., a buyer preferred currency type) being used to purchase a digital asset (e.g., to purchase a token created by asset tokenization module 108). Currency conversion engine 1202 converts the amount of the currency type into an equally valued amount of stablecoin. Currency conversion module 1202 deposits the amount of stablecoin in platform stablecoin account 1208 (e.g., an account maintained internally by transaction ATS broker/dealer 130). Subsequently, currency conversion engine 1202 withdraws the amount of stable coin from the platform stablecoin account 1208. Currency conversion engine 1202 converts the amount of stable coin into an equally valued amount of another currency type (e.g., a seller preferred currency type). Currency conversion engine 1202 sends the amount of the other currency type as trade proceeds of the digital asset purchase.

In one aspect, some amount of stablecoin is retained at platform stablecoin account 1208 to pay any fees associated with a transaction. The stablecoin can be converted into fiat or other appropriate currency and sent to relevant parties to pay fees. As such, disbursed trade proceeds can be reduced by fees associated with the transaction.

More specifically, buyer side converter can receive the amount of the currency type being used to purchase a digital asset. Stablecoin selector 1204 can, on its own and/or through reference to stablecoin records, select an appropriate stablecoin. Buyer side converter 1202 can convert the amount of the currency type to an equally valued amount of the appropriate stablecoin, potentially through reference to a corresponding currency pair. Buyer side converter 1202 can then deposit the amount of the appropriate stablecoin into platform stablecoin account 1208.

Subsequently, (e.g., concurrently with transferring a purchased asset to a buyer) seller side converter 1203 can withdraw the amount of the appropriate stablecoin. Seller side converter 1203 can access a preferred currency associated with a seller (e.g., from seller account information). Seller side converter 1203 can convert the amount of the appropriate stablecoin type (potentially minus any associated fees) to an equally valued amount of the seller's preferred currency, potentially through reference to a corresponding currency pair. Seller side converter 1203 can disburse the amount of the seller's preferred currency as trade proceeds.

Figure 13:
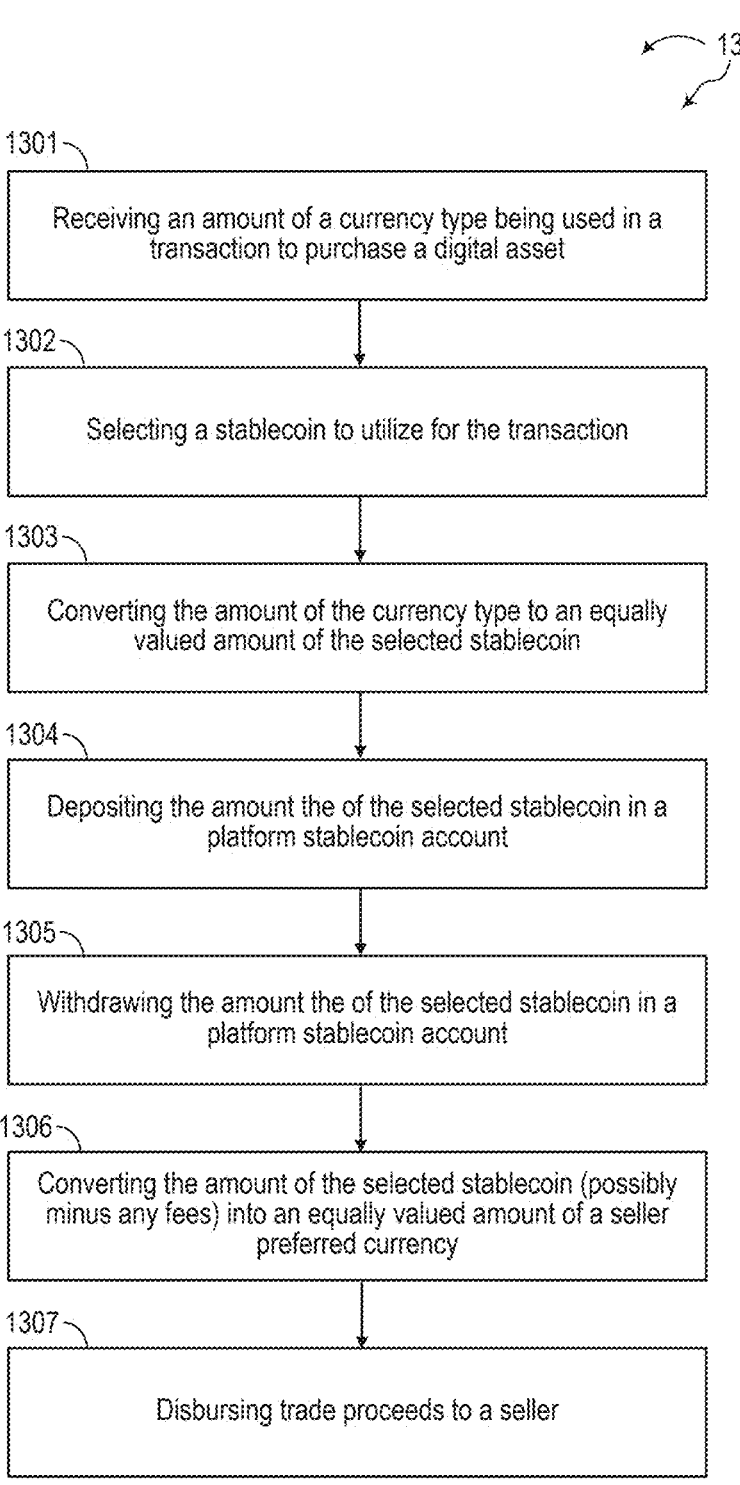
FIG. 13 illustrates a flow chart of an example method for handling currency conversions associated with digital asset transactions.

FIG. 13 illustrates a flow chart of an example method 1300 for handling currency conversions associated with digital asset transactions. Method 1300 will be described with respect to the components and data in computer architecture 1200. As such, method 1300 is suitable for use with the exemplary transaction platform of the systems in FIGS. 1-7.

Method 1300 includes receiving an amount of a currency type being used in a transaction to purchase a digital asset (1301). For example, currency conversion engine 1201 can receive amount 1212 of currency type 1211 from buyer custody module 1206. A buyer associated with buyer custody module 1206 can be using amount 1212 of currency type 1211 to purchase a token at an ATS (e.g., at system 100). The token can represent a fractional interest in another asset. Currency type 1211 may be a crypto type, a stablecoin type, or a fiat type.

Method 1300 includes selecting a stablecoin to utilize for the transaction (1302). For example, stablecoin selector 1204 can select stablecoin type 1012C. In one aspect, stablecoin selector 1204 accessing stablecoin records 1011. Stablecoin selector 1204 considers and/or compares the stability and other characteristics of different coin types included in stablecoin records 1011. Based on stability 1013C and/or other characteristics 1014C, stablecoin selector 1204 can select coin type 1012C.

Stablecoin selector 1204 can consider/compare indicated stability of different stablecoins relative to one another. For example, stablecoin selector 1204 can compare stability 1013A, 1013B and 1013C to one another. From the comparison, stablecoin selector 1204 can determine that stability 1013C indicates increased stability relative to stabilities 1013A and 1013B. Based on the indicated increased stability, stablecoin selector 1204 can select stablecoin type 1012C.

In some aspects, stablecoin selector 1204 also compares other characteristics of stablecoins when selecting a stablecoin. For example, if two stablecoins are equally stable within a margin of error, stablecoin selector 1204 may compare pricing transparency of the two stablecoins. Stablecoin selector 1204 may select the stablecoin with increased pricing transparency. Prior to selecting a stablecoin, stablecoin selector 1204 can also check, in view of other characteristics in stablecoin records 1011, that a stablecoin is permitted for a transaction type, is permitted for use in a transaction for a type of asset, etc.

Method 1300 includes converting the amount of the currency type to an equally valued amount of the selected stablecoin (1303). For example, buyer side converter 1202 can convert amount 1212 of currency type 1211 to amount 1214 of stable coin type 1012C. Buyer side converter 1202 can refer to currency pair 1221. Buyer side converter 1202 can calculate amount 1214 from amount 1214 based on values in currency pair 1221.

Method 1300 includes depositing the amount of the selected stablecoin in a platform stablecoin account (1304). For example, buyer side converter 1202 can deposit amount 1214 of stablecoin 1012C in platform stablecoin account 1208. Method 1300 includes withdrawing the amount of the selected stablecoin from the platform stablecoin account (1305). For example, seller side converter 1203 can withdraw amount 1214 of stablecoin 1012C from platform stablecoin account 1208.

Optionally, after withdrawal, seller side converter 1203 may deduct a fee amount from amount 1214 to cover fees associated with the transaction. Seller side converter can convert the fee amount of stablecoin 1012C into an appropriate currency or currencies for parties to which fees are due. In other aspects, fees may be deducted from amount 1212 of currency type 1211 prior to conversion to stablecoin type 1012C and/or deposit of amount 1214 of stablecoin type 1012C in platform stablecoin account 1208.

Method 1300 includes converting the amount of the selected stablecoin (possibly minus any fees) into an equally valued amount of a seller preferred currency (1306). For example, seller side converter 1202 can convert amount 1214 (possibly minus any fees) of stablecoin type 1012C into amount 1217 of currency type 1216. Currency type 1216 may be a crypto type, a stablecoin type, or a fiat type. In one aspect, seller side converter 1203 refers to account preferences of a user associated with seller custody module 1207 to identify currency type 1216 as the seller preferred currency.

Method 1300 includes disbursing trade proceeds to a seller (1307). For example, currency conversion engine 1201 can send amount 1217 of currency type 1216 at seller custody module 1207.

In one aspect of method 1300, at least one of currency type 1211 and currency type 1216 is a crypto type. As such, conversion into and out of stablecoin type 1012C reduces potential adverse financial impacts on parties associated with the transaction due to crypto volatility.

Transactions with Currency Conversions

Figure 14:
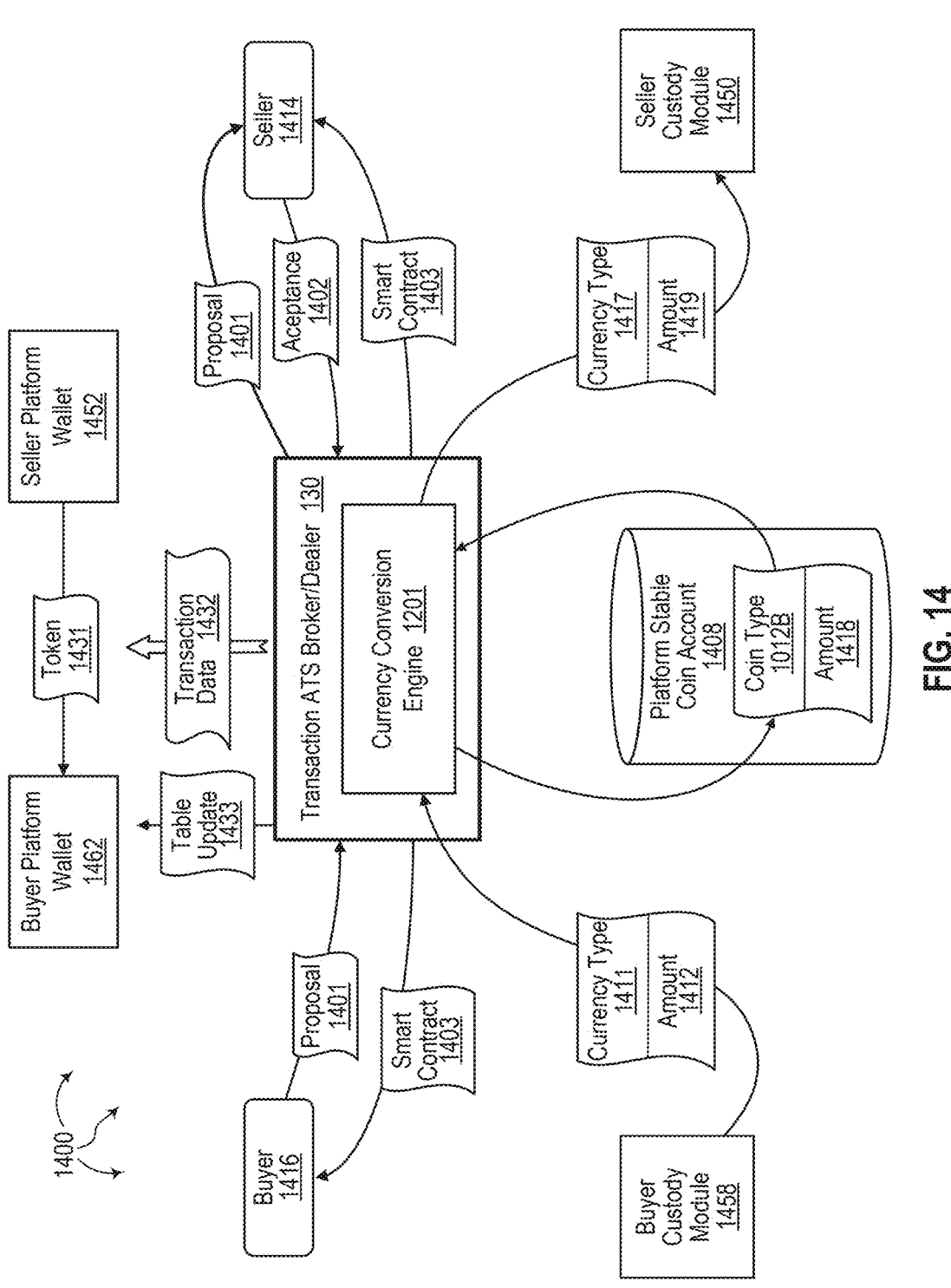
FIG. 14 illustrates an example computer architecture that facilitates settling a transaction including currency conversions.
Figure 14:
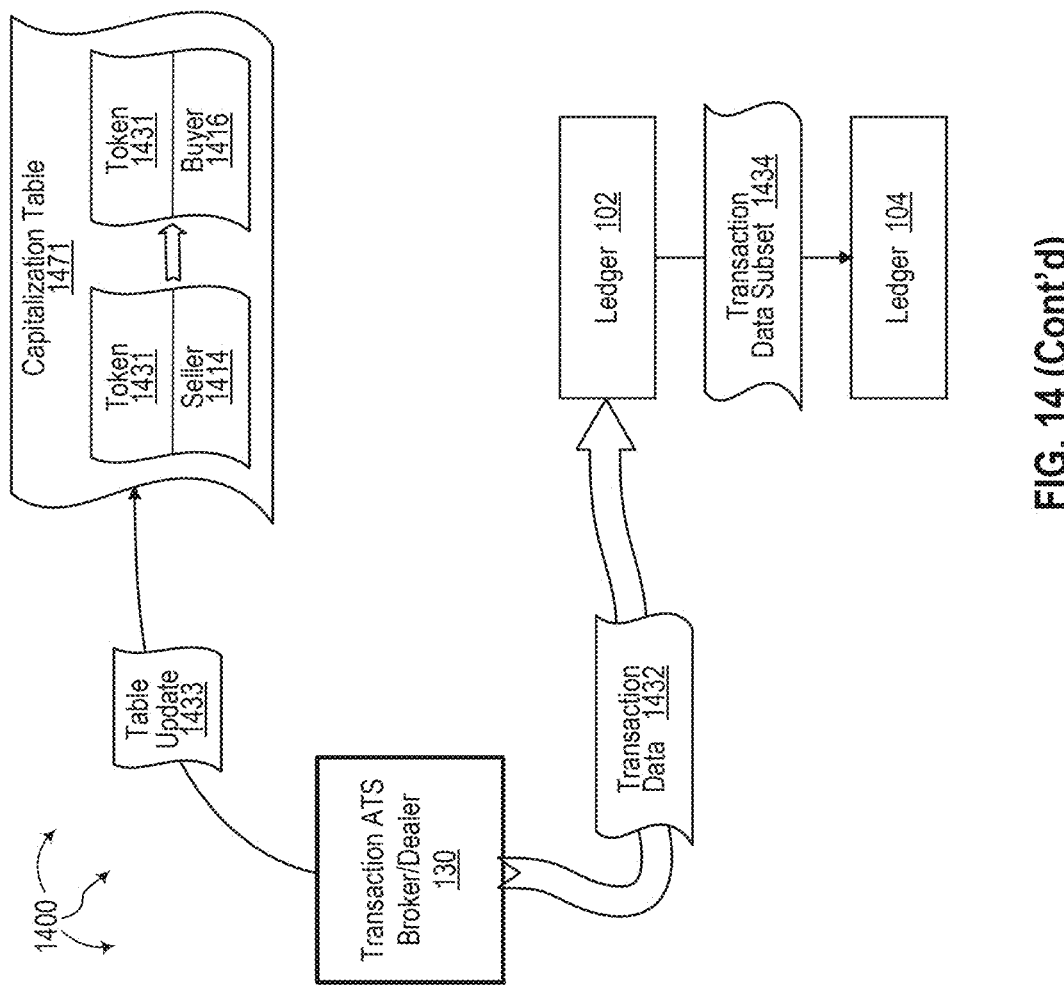

As described, transactions at system 100 can include currency conversions. FIG. 14 illustrates an example computer architecture 1400 that facilitates settling a transaction including currency conversions. The components of FIG. 14 can include, be implemented within and/or can interoperate with any of the components of system 100 and/or of computer system 800. More specifically, computer architecture 1400 depicts transaction ATS broker/dealer 130, which further includes conversion engine 1201, and also depicts ledger 102, and ledger 104.

Seller 1414 can own token 1431 representing a fractional interest in an asset. Ownership of token 1431 can be indicated in capitalization table 1471 for the asset. Buyer 1416 may desire to purchase token 1431 from seller 1414.

Computer architecture 1400 also includes buyer platform wallet 1462, buyer custody module 1458, seller platform wallet 1452, seller custody module 1450, and platform stablecoin account 1408.

FIG. 15 illustrates a flow chart of an example method 1500 for settling a transaction including currency conversions. Method 1500 will be described with respect to the components and data in computer architecture 1400. As such, method 1500 is suitable for use with the exemplary transaction platform of the systems in FIGS. 1-7.

Method 1500 includes electronically receiving an exchange proposal proposing a second entity purchase an interest in an asset from a first entity utilizing a first currency type as payment (1501). For example, buyer 1401 can send proposal 1401 to transaction ATS broker/dealer 130. Proposal 1401 can propose that buyer 1401 purchase token 1341 from seller 141 utilizing amount 1412 of currency type 1411 for payment. Currency type 1411 can be a crypto type, a fiat type, or a stablecoin type.

Transaction ATS broker/dealer 130 can refer to account settings of seller 1414 to identify currency type 1417 as a preferred currency type for seller 1414. From a relevant currency pair, transaction ATS broker/dealer 130 can calculate that amount 1412 of currency type 1411 would convert to a corresponding equally valued amount of currency type 1417 (possibly minus any fees), such as, amount 1419. Transaction ATS broker/dealer 130 can send proposal 1401 to seller 1414 indicating that sale of token 1431 to buyer 1416 would net trade proceeds of amount 1419 of currency type 1417. As such, seller is unaware that buyer 1416 is using currency type 1411 for purchase.

Seller 1414 may approve of proposal 1401 and return acceptance 1402 back to transaction ATS broker/dealer 130.

Method 1500 includes, responsive to receiving the exchange proposal, formulating one or more smart contracts defining one or more transactions transferring a token, representing the interest in the asset, from the first entity to the second entity in exchange for trade proceeds in a second currency type transferred to the first entity (1502). For example, responsive to proposal 1401 and acceptance 1402, transaction ATS broker/dealer 130 can formulate smart contract 1403. Smart contract 1403 can define a transaction wherein: (1) buyer 1416 transfers amount 1412 of currency type 1411 to transaction ATS broker/dealer 130 and in exchange receives token 1431 from seller 1414 and (2) seller 141 receives trade proceeds in amount 1419 of currency type 1417 and in exchange sends token 1431 to buyer 1416.

Transaction ATS broker/dealer 130 can send smart contract 1403 to each of buyer 1416 and seller 1414.

In some aspects, transaction ATS broker/dealer 130 formulates a buyer smart contract with buyer 1416 and formulates a separate seller contract with seller 1414. Using separate buyer and seller contracts, transaction ATS broker/dealer 130 can obscure some buyer information from the seller and obscure some seller information from the buyer. More specifically, the transaction ATS broker/dealer 130 can obscure a currency type used by buyer 1416 from seller 1414. Similarly, transaction ATS broker/dealer 130 obscure a currency type used by seller 1414 from buyer 1416.

For example, a buyer side contract can define that buyer 1416 is to transfer amount 1412 of currency type 1411 to transaction ATS broker/dealer 130 and in exchange ATS broker/dealer 130 is to transfer token 1431 to buyer 1416. Similarly, a seller side contract can define that seller 1414 is to transfer token 1431 to transaction ATS broker/dealer 130 and in exchange ATS broker/dealer 130 is to transfer amount 1419 or currency type 1417 to seller 1414.

Transaction ATS broker/dealer 130 can provide the buyer side contract to buyer 1416 (but not to seller 1414). Transaction ATS broker/dealer 130 can provide seller sider contract to seller 1414 (but not to buyer 1416). As such, each party is aware of their corresponding transaction and details but not of aware of the other party's transaction and details. Thus, seller 1414 is not aware buyer 1416 is transacting in currency type 1411 and, correspondingly, buyer 1416 is not aware seller 1414 is transacting in currency type 1417. Transaction ATS broker/dealer 130 handles currency conversions permitting each part to transact in a desired (or preferred) currency.

Method 1500 includes settling one or more transactions according to the one or more smart contracts capturing transaction data documenting the transaction (1503). For example, in one aspect, transaction ATS broker/dealer 130 can settle a transaction according to smart contract 1403. Alternately, in another aspect, transaction ATS broker/dealer 130 can settle a buyer side contract with buyer 1416 and a seller side contract with seller 1414.

In either aspect, transaction ATS broker/dealer 130 captures transaction data 1432 documenting the transaction (or transactions) and table update 1433. Transaction data 1432 can include currency type 1411, amount 1412, currency type 1417, amount 1419, buyer 1416, seller 1414, an indication token 1431 was transferred from seller 1414 to buyer 1416, an indication that buyer 1416 purchased token 1431 for amount 1412 of currency type 1411, that seller 141 received trade proceeds of amount 1419 of currency type 1417, stablecoin types used during a transaction (e.g., coin type 1012B), stablecoin amounts used during a transaction (e.g., 1418), conversions between stablecoin and other currency, etc.

Settling one or more transactions (1503) includes transferring the token from a digital wallet of the first entity to a digital wallet of the seconding entity (1504). For example, transaction ATS broker/dealer 130 can transfer token 1431 from seller platform wallet 1452 to buyer platform wallet 1462.

Settling one or more transactions (1503) includes transferring the trade proceeds from the second entity to the first entity (1505). For example, transaction ATS broker/dealer 130 can disburse amount 1419 of currency type 1417 to seller custody module 1450.

Transferring the trade proceeds (1505) includes accessing an amount of currency in the first currency type from currency wallet of the second entity (1506). For example, transaction ATS broker/dealer 130 can access amount 1412 of currency type 1411 from buyer custody wallet 1458. Transferring the trade proceeds (1505) includes converting the first currency type to an equal valued amount of stablecoin (1507). For example, currency conversion 1201 can convert amount 1412 of currency type 1411 to amount 1418 of coin type 1012B. Coin type 1012B can be selected due to increased stability relative to other stablecoin types, potentially through reference to stablecoin records 1011.

Currency conversion engine 1201 can deposit amount 1418 of coin type 1012B in platform stablecoin account 1408. Subsequently, and concurrently with transferring token 1431, currency conversion engine 1201 can withdraw amount 1418 of coin type 1012B from platform stablecoin account 1408.

Transferring the trade proceeds (1505) includes subsequent to converting the first currency type to an equal valued amount of stablecoin, converting the amount of stablecoin to an equal valued amount of currency in the second currency type (1508). For example, currency conversion engine 1201 can convert amount 1418 of coin type 1012B (possibly minus any fees) to amount 1419 of currency type 1417. Transferring the trade proceeds (1505) includes transferring the amount of currency in the second currency type to a currency wallet of the first entity (1509). For example, transaction ATS broker/dealer 130 can disburse amount 1419 of currency type 1417 to seller custody module 1450.

In another aspect, transaction ATS broker/dealer 130 settles a buyer side transaction with buyer 1416 in accordance with a buyer side contract and settles a seller side transaction with seller 1414 in accordance with a seller side contract. Settling the buyer side contract can include buyer 1416 transferring amount 1412 of currency type 1411 (a purchase price) to transaction ATS broker/dealer 130 in exchange for transaction ATS broker/dealer 130 sending token 1431 to buyer 1416. Settling the seller side contract can include seller 1414 sending token 1431 to transaction ATS broker/dealer 130 in exchange for transaction ATS broker/dealer 130 sending amount 1419 of currency type 1417 (trade proceeds) to seller 1414. Buyer 1416 and seller 1414 each perform in accordance with their corresponding contract and have no knowledge of the currency type being used by the other party. That is, seller 1414 has no knowledge buyer 1416 is transacting in currency type 1411 and similarly buyer 1416 has no knowledge seller 141 is transacting in currency type 1417.

Transaction ATS broker/dealer 130 can hold currency and/or token 1431 in escrow until both a buyer side contract and/or a seller side contract settle. In one aspect, transaction ATS broker/dealer 130 initially obtains token 1431 (in accordance with the seller side contract) and amount 1412 of currency type 1411. Subsequently, after both token 1431 and amount 1412 of currency type 1411 are successfully obtained, Transaction ATS broker/dealer 130 sends token 1431 to buyer 1416 and amount 1419 of currency 1417 (after conversion through coin type 1012B) to seller 141.

In one aspect, at least one of currency type 1411 and currency type 1419 is a crypto type. As such, conversion into and out of stablecoin type 1012B reduces potential adverse financial impacts on parties associated with the transaction due to crypto volatility.

Method 1500 includes updating ownership interests in the asset within an electronic capitalization table, including defining the interest in the asset is owned by the second entity (1510). For example, transaction ATS broker/dealer 130 can implement table update 1433 to capitalization table 1471. Table update 1433 can alter capitalization table 1471 to indicate that seller 1414 does not own token 1431 and that buyer 1416 does own token 1431.

Method 1500 incudes digitally preserving evidence of settlement in a private mutable ledger and a public immutable ledger (1511). For example, transaction ATS broker/dealer 130 can preserve evidence of transaction (or transactions) settlement in ledgers 102 (a private mutable ledger) and 104 (a public immutable ledger). Digitally preserving evidence of settlement (1511) includes recording the transaction data in the private mutable ledger (1512). For example, transaction ATS broker/dealer 130 can record transaction data 1432 in ledger 102.

Digitally preserving evidence of settlement (1511) includes semi-redundantly synchronizing the public immutable ledger with the private mutable ledger including recording at least a subset of the transaction data in the public immutable ledger (1513). For example, transaction data subset 1434 can be synchronized to ledger 102. Transaction data subset 1434 can be a subset of transaction data 1432. Data subset 1434 may include some but not all and/or partially redacted portions of: currency type 1411, amount 1412, currency type 1417, amount 1419, buyer 1416, seller 1414, an indication token 1431 was transferred from seller 1414 to buyer 1416, an indication that buyer 1416 purchased token 1431 for amount 1412 of currency type 1411, that seller 141 received trade proceeds of amount 1419 of currency type 1417, coin type 1012B, amount 1418, conversion between currency type 1411 and coin type 1012B, conversion between coin type 1012B and currency type 1147, etc.

In some aspects, transaction data 1432 and portions thereof, such as, data subset 1434, is synced between ledger 102 and ledger 104 in accordance with the techniques described in FIGS. 9A, 9B, and 9C.

The methods, systems, and technologies of the present invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

System 100, computer architecture 1000, computer architecture 1200, computer architecture 1400, etc. can be implemented in a cloud computing environment and/or using a cloud computing model.

An example initial use case for the disclosed technology is for use within a financial exchange that includes a secondary market for digital shares of real assets, such as, an Alternative Trading System (ATS).

Each of the processes, methods, and algorithms described in the preceding sections may be embodied in, and fully or partially automated by, code components executed by one or more computer systems or computer processors comprising computer hardware. Each of the processes, methods, and algorithms described in the preceding sections may occur sequentially, partially sequentially, partially concurrently, or fully concurrently. For example, coin characteristic derivation module 1001, coin data ingestor 1003, currency conversion engine 1201, buyer side converter 1202, seller side converter 1203, stablecoin selector 1204, etc. may be participating in different aspects of currency conversion for multiple transactions at any time. Different portions of the processes, methods, and algorithms described in the preceding sections may occur sequentially, partially sequentially, partially concurrently, or fully concurrently. For example, currency conversion engine 1201 may be concurrently performing multiple currency conversions and the currency conversions may be happening concurrently with coin characteristic derivation module 1001 deriving stablecoin characteristics.

The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits.

Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the computer system 800. In example embodiments, system 100, computer architecture 1000, computer architecture 1200, computer architecture 1400, etc. provide currency conversion suitable for converting currency associated with asset trading and/or on a financial exchange.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or activities.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

In one aspect, a method may include an operation, an instruction, and/or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

The functions, acts or tasks illustrated in the Figures or described may be executed in a digital and/or analog domain and in response to one or more sets of logic or instructions stored in or on non-transitory computer readable medium or media or memory. The functions, acts or tasks are independent of the particular type of instructions set, storage media, processor or processing strategy and may be performed by software, hardware, integrated circuits, firmware, microcode and the like, operating alone or in combination. The memory may comprise a single device or multiple devices that may be disposed on one or more dedicated memory devices or disposed on a processor or other similar device.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   accessing transaction data resulting from a settled transaction changing ownership in an asset at an Alternative Trading System (ATS) and including evidence of a currency conversion between a stablecoin and another currency, the stablecoin selected based on stablecoin characteristics maintained in a stablecoin record;
   accessing an intentional lag time defining a fixed amount of time to delay between detecting a data entry being written to a mutable database and subsequently syncing a blockchain with the mutable database, the specified amount of time increasing the likelihood of written data entries being complete and correct at the mutable database prior to syncing;
   detecting a part of the transaction data captured to the mutable database during monitoring the mutable database, the part of the transaction data reflecting the currency conversion and the stablecoin characteristics used during transaction settlement at the mutable database;
   delaying syncing the blockchain with the mutable database by the fixed amount of time upon detecting the part of the transaction data being captured; and
   responsive to completion of the delay, syncing the blockchain with the mutable database by recording at least a portion of the transaction data from the mutable database to the blockchain, the at least a portion of the transaction data including another part of the transaction data written to the mutable database during the delay.

2. The computer-implemented method of claim 1, wherein accessing an intentional lag time comprises accessing an intentional lag time defining the amount length of time to balance data integrity risk associated with syncing the blockchain with the database relative to update frequency at the immutable public ledger.

3. The computer-implemented method of claim 1, wherein accessing an intentional lag time comprises accessing a random lag time defining the specified amount of time selected randomly by a randomizer.

4. The computer-implemented method of claim 1, further comprising:
   detecting other data written to the database during the monitoring;
   delaying syncing the blockchain with the database by the specified amount of time after detecting the other data being written; and
   after the delay, syncing the blockchain with the database by recording at least a portion of the other data from the database to the blockchain.

5. The computer-implemented method of claim 1, further comprising auditing the integrity of the database including:
   comparing a selected data entry written on the database at a particular date with a corresponding data entry on the blockchain at a present date back to the particular date;
   detecting a mismatch between the selected data entry and the corresponding data entry; and
   facilitating transmission of an alert based on the detected mismatch.

6. The computer-implemented method of claim 1:
   wherein detecting a part of the transaction data comprises detecting personally identifiable information and other transaction information;
   further comprising generating a hashID of the personally identifiable information;
   further comprising storing the hashID at a storage location outside the blockchain; and
   wherein syncing the blockchain with the database comprises recording the other transaction information along with the hashID to the blockchain.

7. The computer-implemented method of claim 1, wherein detecting a part of the transaction data captured to the database comprises detecting a part of the transaction data that incudes personally identifiable information; and
   wherein syncing the blockchain with the database comprises recording the transaction data to the blockchain obscuring the personally identifiable information.

8. The computer-implemented method of claim 1, wherein accessing an intentional lag time comprises accessing an intentional lag time defining a specified fixed amount of time to delay between detecting a data entry being written to the database and syncing the blockchain with the database.

9. The computer-implemented method of claim 1, wherein accessing an intentional lag time comprises accessing a lag time defining a specified amount of time to delay minimizing the likelihood of having to update the transaction data within the blockchain after the at least a portion of the transaction data is recorded to the blockchain.

10. The computer-implemented method of claim 1, wherein accessing an intentional lag time comprises accessing an intentional lag time defining a specified amount of time to delay based on business practices implemented at an Alternative Trading System (ATS).

11. The computer-implemented method of claim 1, wherein accessing an intentional lag time comprises accessing an intentional lag time defining 24 hours to delay between detecting a data entry being written to the database and syncing the blockchain with the database.

12. A system comprising;
a hardware processor;
system memory coupled to the hardware processor and storing instructions configured to cause the hardware processor to:
access transaction data resulting from a settled transaction changing ownership in an asset at an Alternative Trading System (ATS) and including evidence of a currency conversion between a stablecoin and another currency, the stablecoin selected based on stablecoin characteristics maintained in a stablecoin record;
access an intentional lag time defining a fixed amount of time to delay between detecting a data entry being written to a mutable database and subsequently syncing a blockchain with the mutable database, the specified amount of time increasing the likelihood of written data entries being complete and correct at the mutable database prior to syncing;
detect a part of the transaction data captured to the mutable database during monitoring the mutable database, the part of the transaction data reflecting the currency conversion and the stablecoin characteristics used during transaction settlement at the mutable database;
delay syncing the blockchain with the mutable database by the fixed amount of time upon detecting the part of the transaction data being captured; and
responsive to completion of the delay, sync the blockchain with the mutable database by recording at least a portion of the transaction data from the mutable database to the blockchain, the at least a portion of the transaction data including another part of the transaction data written to the mutable database during the delay.

13. The system of claim 12, wherein instructions configured to cause the hardware processor to access an intentional lag time comprise instructions configured to cause the hardware processor to access an intentional lag time defining the specified amount of time to balance data integrity risk associated with syncing the blockchain with the database relative to an update frequency at the blockchain.

14. The system of claim 12, wherein instructions configured to cause the hardware processor to access an intentional lag time comprise instructions configured to cause the hardware processor to access a random lag time defining the specified amount of time selected randomly by a randomizer.

15. The system of claim 12, further comprising instructions configured to cause the hardware processor to:
detect other data written to the database during the monitoring;
delay syncing the blockchain with the database by the specified length of time after detecting the other data being written; and
after the delay, sync the blockchain with the database by recording at least a portion of the other data to the blockchain.

16. The system of claim 12, further comprising instructions configured to cause the hardware processor to audit the integrity of the database including:
compare a selected data entry written on the database at a particular date with a corresponding data entry on the blockchain at a present date back to the particular date;
detect a mismatch between the selected data entry and the corresponding data entry; and
facilitate transmission of an alert based on the detected mismatch.

17. The system of claim 12, wherein instructions configured to cause the hardware processor to detect a part of the transaction data comprises instructions configured to cause the hardware processor to detect personally identifiable information and other transaction information;
further comprising instructions configured to cause the hardware processor to generate a hashID of the personally identifiable information;
further comprising instructions configured to cause the hardware processor store the hashID at a storage location outside the blockchain; and
wherein instructions configured to cause the hardware processor to sync the blockchain with the database comprise instructions configured to cause the hardware processor to record the other transaction information along with the hashID to the blockchain.

18. The system of claim 12, wherein instructions configured to cause the hardware processor to access an intentional lag time comprise instructions configured to cause the hardware processor to access a lag time defining a specified amount of time to delay minimizing the likelihood of having to update the transaction data within the blockchain after the at least a portion of the transaction data is recorded to the blockchain.

19. The system of claim 12, wherein instructions configured to cause the hardware processor to access an intentional lag time comprise instructions configured to cause the hardware processor to access an intentional lag time defining a specified amount of time to delay based on business practices implemented at an Alternative Trading System (ATS).

20. The system of claim 12, wherein instructions configured to cause the hardware processor to access an intentional lag time comprise instructions configured to cause the hardware processor to access an intentional lag time defining 24 hours to delay between detecting a data entry being written to the database and syncing the blockchain with the database.

* * * * *